(12) United States Patent
Peterson

(10) Patent No.: US 10,393,176 B2
(45) Date of Patent: Aug. 27, 2019

(54) BEARING ASSEMBLIES AND APPARATUSES INCLUDING SUPERHARD BEARING ELEMENTS

(71) Applicant: US Synthetic Corporation, Orem, UT (US)

(72) Inventor: S. Barrett Peterson, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 15/395,834

(22) Filed: Dec. 30, 2016

(65) Prior Publication Data
US 2017/0108040 A1     Apr. 20, 2017

Related U.S. Application Data

(63) Continuation of application No. 14/292,801, filed on May 30, 2014, now Pat. No. 9,562,562.

(51) Int. Cl.
| | | |
|---|---|---|
| *F16C 23/04* | (2006.01) | |
| *F16C 17/02* | (2006.01) | |
| *E21B 4/00* | (2006.01) | |
| *F16C 33/04* | (2006.01) | |
| *F16C 17/10* | (2006.01) | |

(52) U.S. Cl.
CPC ............ *F16C 33/043* (2013.01); *E21B 4/003* (2013.01); *F16C 17/02* (2013.01); *F16C 17/10* (2013.01); *F16C 23/04* (2013.01); *F16C 2206/04* (2013.01); *F16C 2352/00* (2013.01)

(58) Field of Classification Search
CPC ........ F16C 17/02; F16C 17/10; F16C 17/105; F16C 23/043; F16C 23/045; F16C 23/048; F16C 33/043; F16C 2206/02; F16C 2352/00

USPC .................................................. 384/206, 282
See application file for complete search history.

(56) References Cited

U.S. PATENT DOCUMENTS

| | | | |
|---|---|---|---|
| 3,478,523 A | 11/1969 | Reusser et al. | |
| 3,887,248 A | 6/1975 | Riegler | |
| 4,029,368 A | 6/1977 | Tschirky et al. | |
| 4,080,014 A | 3/1978 | Riegler et al. | |
| 4,141,605 A | 2/1979 | Riordan et al. | |

(Continued)

FOREIGN PATENT DOCUMENTS

| | | |
|---|---|---|
| RU | 2044176 | 9/1995 |
| RU | 107299 | 8/2011 |

OTHER PUBLICATIONS

International Search Report and Written Opinion, dated Oct. 15, 2015 in corresponding International Application No. PCT/US2015/032766 with International Filing Date of May 27, 2015.

*Primary Examiner* — James Pilkington
(74) *Attorney, Agent, or Firm* — FisherBroyles, LLP

(57) ABSTRACT

A bearing assembly includes a support ring circumferentially surrounding a central bearing axis and a plurality of superhard bearing elements coupled to the support ring. Each of the plurality of superhard bearing elements has a base, a superhard bearing surface, and an element side surface extending between the base and the superhard bearing surface. The superhard bearing surface has a partial-ellipsoidal surface shape. A bearing apparatus includes an inner bearing assembly and an outer bearing assembly. A subterranean drilling system includes an output shaft operably coupled to a bearing apparatus.

13 Claims, 19 Drawing Sheets

(56) References Cited

U.S. PATENT DOCUMENTS

| | | | | |
|---|---|---|---|---|
| 4,190,301 | A | 2/1980 | Lachonius et al. | |
| 4,410,054 | A | 10/1983 | Nagel et al. | |
| 4,560,014 | A | 12/1985 | Geczy | |
| 4,720,199 | A | 1/1988 | Geczy et al. | |
| 4,738,322 | A | 4/1988 | Hall et al. | |
| 4,756,631 | A | 7/1988 | Jones | |
| 4,914,865 | A | 4/1990 | Wiand et al. | |
| 5,267,398 | A | 12/1993 | Hall | |
| 7,552,782 | B1 | 6/2009 | Sexton et al. | |
| 7,866,418 | B2 | 1/2011 | Bertagnolli et al. | |
| 7,870,913 | B1 | 1/2011 | Sexton et al. | |
| 7,901,137 | B1 * | 3/2011 | Peterson | F16C 17/02 175/403 |
| 7,934,776 | B2 | 5/2011 | de Andrade et al. | |
| 8,210,747 | B2 | 7/2012 | Cooley et al. | |
| 8,312,631 | B2 | 11/2012 | Sexton | |
| 8,613,554 | B2 | 12/2013 | Tessier et al. | |
| 8,708,564 | B2 | 4/2014 | Cooley et al. | |
| 8,814,434 | B1 | 8/2014 | Sexton | |
| 2007/0046119 | A1 | 3/2007 | Cooley | |
| 2009/0008892 | A1 | 1/2009 | Gaumer | |
| 2010/0226759 | A1 | 9/2010 | Cooley et al. | |
| 2010/0237621 | A1 * | 9/2010 | Tessier | F16C 17/03 290/52 |
| 2010/0288558 | A1 * | 11/2010 | Sexton | E21B 4/003 175/92 |
| 2011/0024198 | A1 | 2/2011 | Dick et al. | |
| 2011/0192648 | A1 | 8/2011 | Baudoin | |
| 2012/0039551 | A1 * | 2/2012 | Cooley | F16C 17/02 384/26 |
| 2012/0057814 | A1 * | 3/2012 | Dadson | E21B 4/003 384/129 |
| 2012/0281938 | A1 | 11/2012 | Peterson et al. | |
| 2012/0321232 | A1 * | 12/2012 | Cooley | E21B 4/003 384/129 |
| 2013/0004106 | A1 * | 1/2013 | Wenzel | F16C 17/10 384/428 |
| 2013/0170778 | A1 | 7/2013 | Higginbotham et al. | |

* cited by examiner

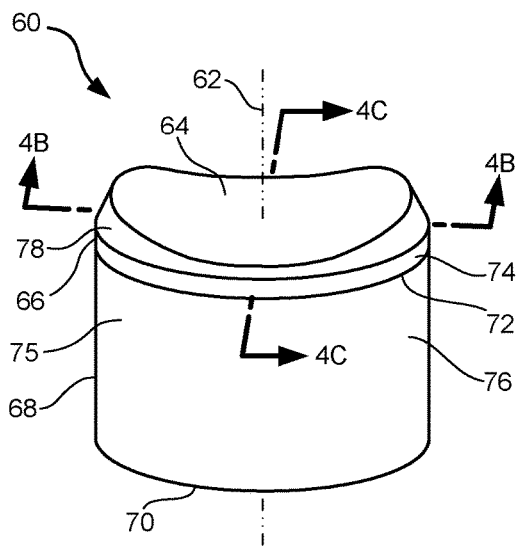
FIG. 4A
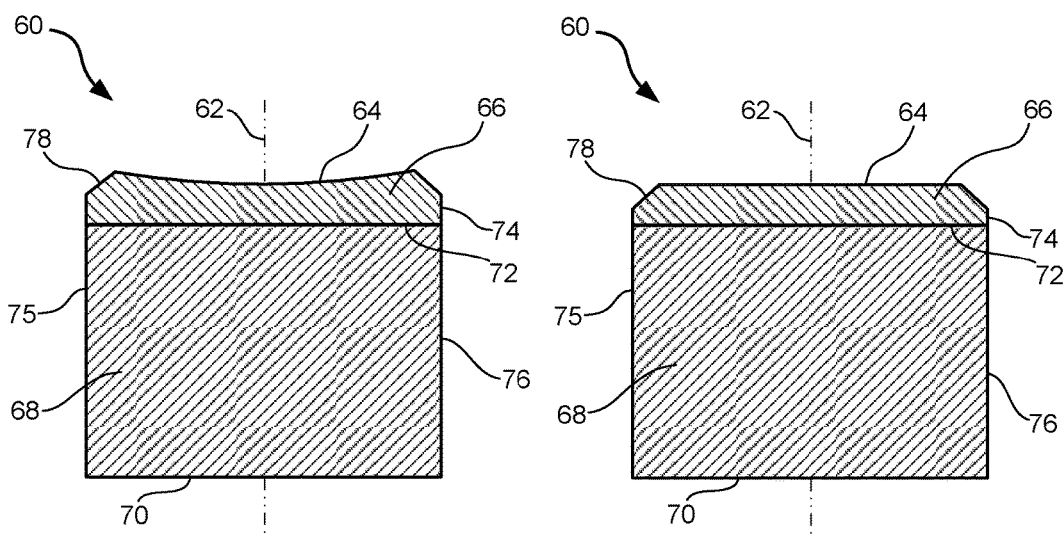
FIG. 4B
FIG. 4C

BEARING ASSEMBLIES AND APPARATUSES INCLUDING SUPERHARD BEARING ELEMENTS

REFERENCE TO RELATED APPLICATIONS

This application is a continuation of U.S. patent application Ser. No. 14/292,801, titled "BEARING ASSEMBLIES AND APPARATUSES INCLUDING SUPERHARD BEARING ELEMENTS" and filed 30 May 2014, the disclosure of which is hereby incorporated, in its entirety, by this reference.

BACKGROUND

Thrust and radial-bearing apparatuses are commonly used in a variety of mechanical applications. For example, subterranean drilling systems, turbomachinery, hydroelectric plants, wind mills, cranes, turbine generators, and power plant machinery may utilize bearing assemblies.

A conventional subterranean drilling system may include one or more thrust-bearing and/or radial-bearing apparatuses that are operably coupled to the downhole drilling motor for carrying loads generated during drilling operations. Radial-bearing apparatuses utilized in such drilling systems may each include a stator that does not rotate and a rotor that is surrounded by the stator and that is attached to the output shaft so as to rotate with the output shaft. The stator and rotor may each include a plurality of superhard bearing elements or inserts.

Wear-resistant, superhard materials are commonly utilized for bearing elements utilized in radial-bearing assemblies. A conventional polycrystalline diamond compact ("PDC") radial-bearing assembly may include steel rotor and stator bearing rings that are each configured to accept a number of superhard bearing elements. Each superhard bearing element may include a polycrystalline diamond ("PCD") layer formed on a cemented tungsten carbide substrate. One or more superhard bearing elements may be attached to a bearing rotor or stator by press-fitting, brazing, or through other suitable methods of attachment. Typically, bearing elements attached to a radial-bearing rotor have superhard bearing surfaces configured and oriented radially outward so as to bear against opposing superhard bearing surfaces of bearing elements attached to a radial-bearing stator that radially surrounds the radial-bearing rotor.

During drilling operations, an output shaft that transfers rotational torque from a drilling motor to a drill bit may be deflected at various angles relative to the rotational axis of a bearing apparatus. Over time, such repeated deflection of the output shaft may cause a radial-bearing rotor attached to the output shaft to become axially misaligned with respect to a radial-bearing stator surrounding the radial-bearing rotor. Axial misalignment of the radial-bearing rotor from the radial-bearing stator may result in a decrease in bearing performance or bearing failure.

SUMMARY

The instant disclosure is directed to exemplary bearing assemblies systems, and bearing apparatuses. According to at least one embodiment, a bearing assembly (e.g., a rotor or a stator for a radial-bearing apparatus) may comprise a support ring circumferentially surrounding a central bearing axis and a plurality of superhard bearing elements coupled to the support ring. Each of the plurality of superhard bearing elements may comprise a base, a superhard bearing surface, and an element side surface extending between the base and the superhard bearing surface. The superhard bearing surface may comprise a partial-ellipsoidal surface shape, such as a partial-spherical surface.

In some embodiments, the superhard bearing surface may have a radius of curvature that is substantially centered about the central bearing axis. Additionally, the superhard bearing surfaces of the plurality of superhard bearing elements may comprise partial-ellipsoidal surfaces extending along separate portions of a single ellipsoidal surface outline. According to at least one embodiment, the superhard bearing surface may include a convex surface oriented outwardly from the central bearing axis. Each of the plurality of superhard bearing elements may be fixed within bearing-element recesses defined within the support ring. In certain embodiments, the plurality of superhard bearing elements may each be oriented at an oblique angle from the central bearing axis. In additional embodiments, the plurality of superhard bearing elements may be distributed in a plurality of rows extending circumferentially about the central bearing axis. The at least one superhard bearing element may comprise a polycrystalline diamond table that is bonded to a substrate.

According to at least one embodiment, a bearing apparatus (e.g., a radial-bearing assembly) may comprise an inner bearing assembly having an inner support ring circumferentially surrounding an inner ring axis and a first plurality of superhard bearing elements each having an element side surface extending between a base and a superhard bearing surface, the superhard bearing surface comprising a partial-ellipsoidal surface shape. The bearing apparatus may also comprise an outer bearing assembly having an outer support ring circumferentially surrounding an outer ring axis and a second plurality of superhard bearing elements each having an element side surface extending between a base and a superhard bearing surface. The superhard bearing surface of each of the second plurality of superhard bearing elements may contact a superhard bearing surface of at least an opposing one of the first plurality of superhard bearing elements.

The superhard bearing surface of each of the second plurality of superhard bearing elements may comprise an arcuate surface. The superhard bearing surface of each of the first plurality of superhard bearing elements may comprise a convex surface and the superhard bearing surface of each of the second plurality of superhard bearing elements may comprise a concave surface. For example, the superhard bearing surface of each of the second plurality of superhard bearing elements may comprise a partial-ellipsoidal surface shape. In additional embodiments, the superhard bearing surface of each of the second plurality of superhard bearing elements may comprise a flat surface.

According to various embodiments, the inner bearing assembly may be rotatable relative to the outer bearing assembly when the inner ring axis is oriented at an angle from the outer ring axis. The inner bearing assembly may be configured as one of a rotor and a stator and the outer bearing assembly may be configured as the other of the rotor and the stator. In some embodiments, the first plurality of superhard bearing elements may be distributed in a plurality of rows extending circumferentially about the inner ring axis.

In at least one embodiment, a subterranean drilling system may comprise an output shaft operable to apply torque to a rotary drill tool, the output shaft operably coupled to a bearing apparatus. The bearing apparatus may comprise an inner bearing assembly having an inner support ring and a first plurality of superhard bearing elements each having an element side surface extending between a base and a superhard bearing surface, the superhard bearing surface comprising a partial-ellipsoidal surface shape. The bearing apparatus may further comprise an outer bearing assembly having an outer support ring and a second plurality of superhard bearing elements each having an element side surface extending between a base and a superhard bearing surface, the superhard bearing surface of each of the second plurality of superhard bearing elements contacting a superhard bearing surface of at least an adjacent one of the first plurality of superhard bearing element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4A is a perspective view of an exemplary superhard bearing element including a substrate and a superhard table according to at least one embodiment.

FIG. 4B is a cross-sectional side view of the exemplary superhard bearing element shown in FIG. 4A.

FIG. 4C is a cross-sectional side view of the exemplary superhard bearing element shown in FIG. 4A.

Figure 1:
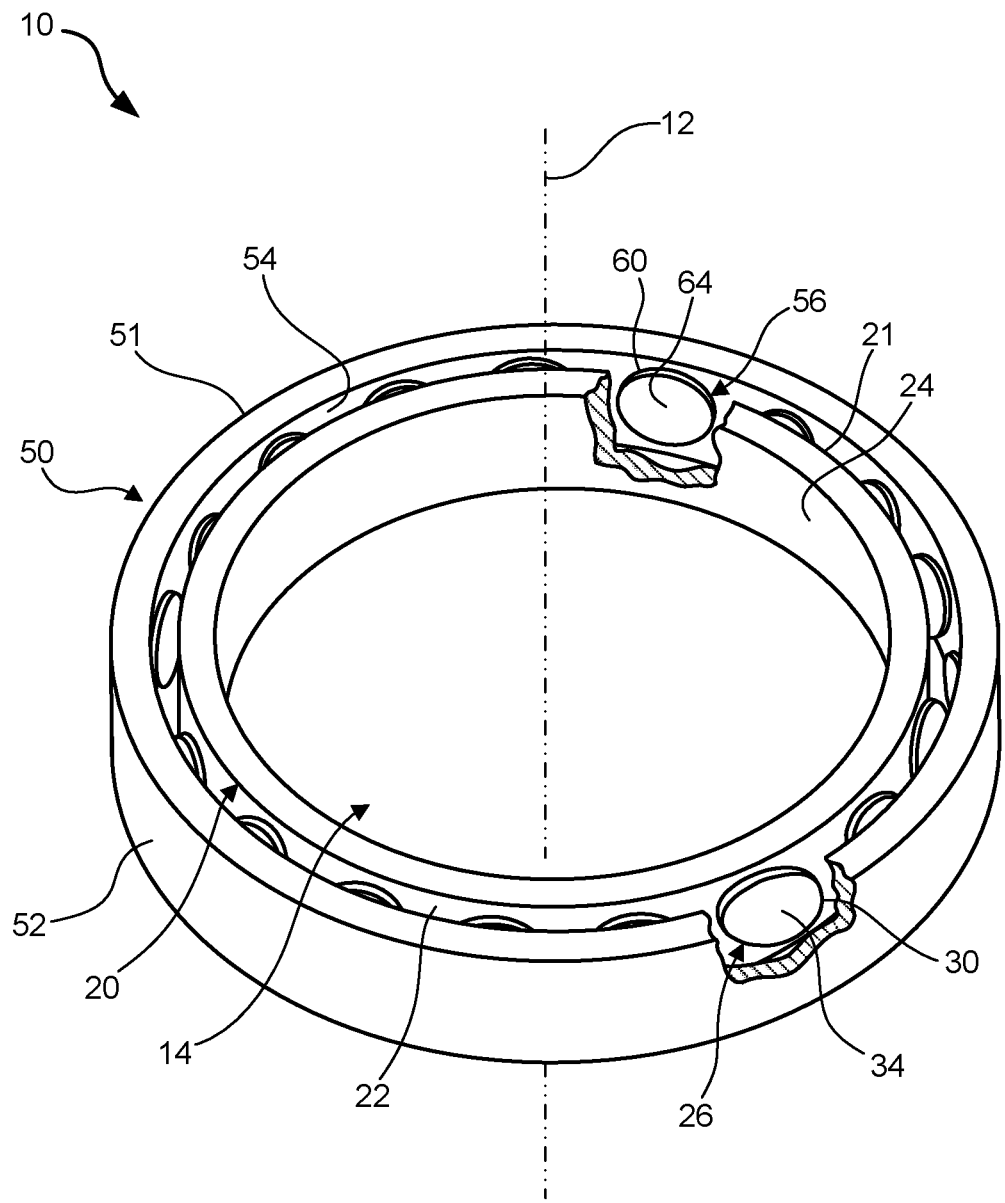
FIG. 1 is a perspective view of a radial-bearing apparatus according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary bearing assemblies and bearing apparatuses including superhard bearing elements. These bearing apparatuses may include radial bearings, thrust bearings, and other bearing apparatuses without limitation. Such bearing apparatuses may be used in a variety of applications, including subterranean drilling systems, directional drilling systems, turbine generators, wind mills, cranes, very large machinery and any other suitable applications, without limitation.

The terms "superabrasive" and "superhard," as used herein, may refer to any material having a hardness that is at least equal to a hardness of tungsten carbide. For example, a superhard article may represent an article of manufacture, at least a portion of which may exhibit a hardness that is equal to or greater than the hardness of tungsten carbide.

Figure 2:
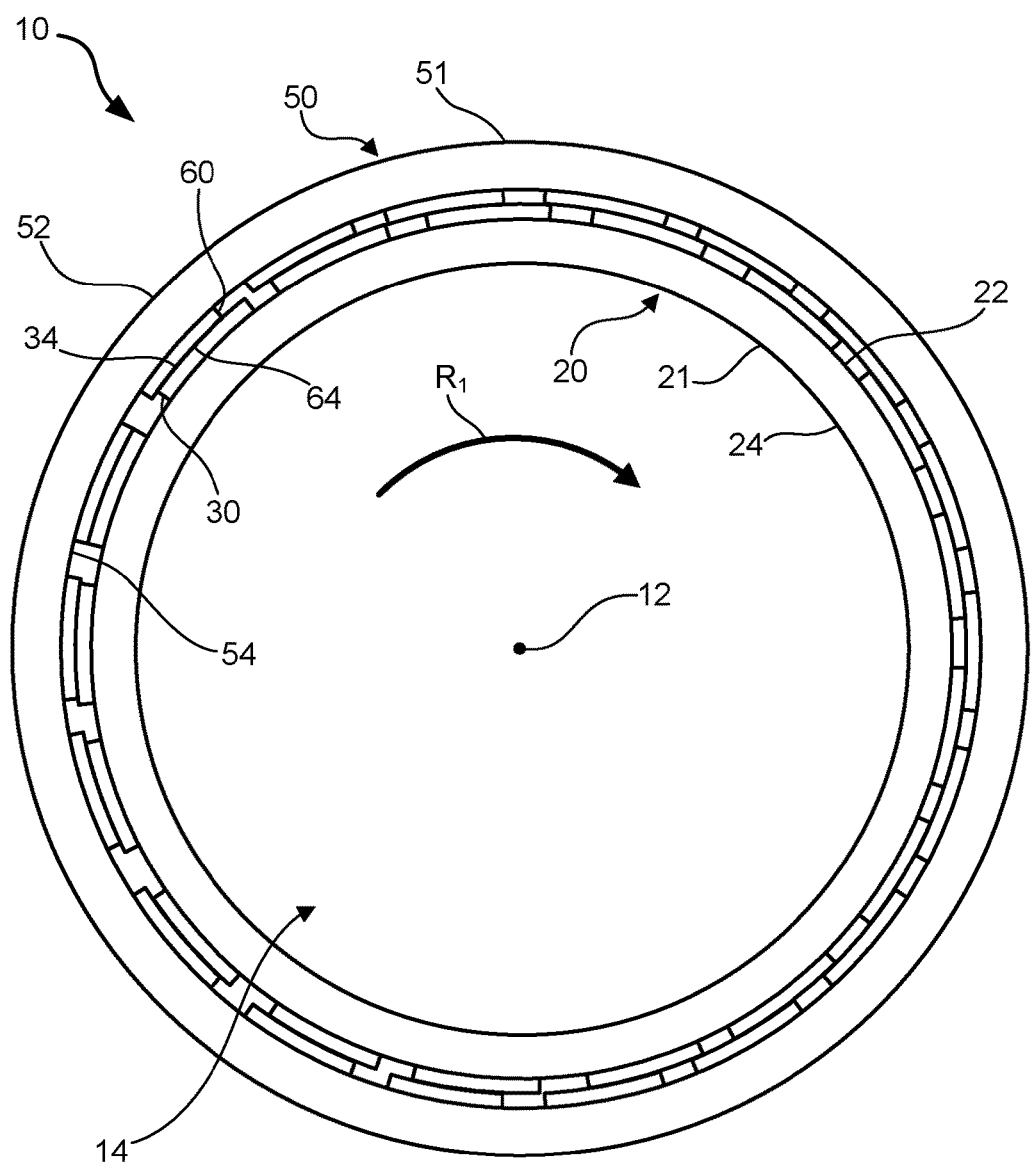
FIG. 2 is a top view of the radial-bearing apparatus shown in FIG. 1

FIGS. 1 and 2 illustrate an exemplary radial-bearing apparatus 10 according to at least one embodiment. As illustrated in FIGS. 1 and 2, radial-bearing apparatus 10 may comprise an inner bearing assembly 20, or inner race, having a plurality of superhard bearing elements 30 coupled to an inner support ring 21. Radial-bearing apparatus 10 may additionally comprise an outer bearing assembly 50, or outer race, having a plurality of superhard bearing elements 60 coupled to an outer support ring 51. Either of inner bearing assembly 20 and outer bearing assembly 50 may be configured as a rotor or a stator. If, for example, outer bearing assembly 50 is configured to remain stationary, outer bearing assembly 50 may be referred to as the stator and the inner bearing assembly 20 may be referred to as the rotor that rotates relative to outer bearing assembly 50. Alternatively, inner bearing assembly 20 may be a stator configured to remain stationary and outer bearing assembly 50 may be a rotor configured to rotate relative to inner bearing assembly 20.

Inner bearing assembly 20 and outer bearing assembly 50 may each be arranged circumferentially around a central bearing axis 12. Central bearing axis 12 may also comprise a rotational axis about which inner bearing assembly 20 or outer bearing assembly 50 rotates. However, as will be discussed in greater detail below in reference to FIGS. 9-12, a rotational axis of inner bearing assembly 20 and/or outer bearing assembly 50 may not be aligned with central bearing axis 12 at all times during operation. For example, during a drilling operation, outer bearing assembly 50 may be circumferentially centered about central bearing axis 12 while inner bearing assembly is circumferentially centered about and/or rotates about a rotational axis that is oriented at an angle with respect to central bearing axis 12. Inner support ring 21 may comprise an outer surface 22 facing radially outward and an inner surface 24 facing radially inward with respect to central bearing axis 12. Outer support ring 51 may comprise an outer surface 52 facing radially outward and an inner surface 54 facing radially inward with respect to central bearing axis 12. Radial-bearing apparatus 10 may include an aperture 14 defined by inner surface 24 of inner support ring 21 that is configured to receive a shaft (e.g., a rotational motor shaft). Aperture 14 may be generally centered about central bearing axis 12.

Inner support ring 21 may be configured to receive multiple superhard bearing elements 30 that may each be attached within a corresponding bearing-element recess 26 defined in inner support ring 21. Additionally, outer support ring 51 may be configured to receive multiple superhard bearing elements 60 that may each be attached within a corresponding bearing-element recess 56 defined in outer support ring 51. Each superhard bearing element 30 may extend beyond outer surface 22 of inner support ring 21 by a selected distance. Additionally, each superhard bearing element 60 may extend beyond inner surface 54 of outer support ring 51 by a selected distance. Each of superhard bearing elements 30 and superhard bearing elements 60 may be fixedly secured within a corresponding bearing-element recess 26 or 56, respectively, through brazing, press-fitting, threaded attachment, pin attachment, bonding, frictional engagement, and/or by any other suitable attachment mechanism, without limitation.

Any suitable number of superhard bearing elements 30 and superhard bearing elements 60 may be secured, respectively, to inner support ring 21 and outer support ring 51. For example, each superhard bearing element 30 may be secured within a corresponding bearing element recess 26 defined in inner support ring 21. Additionally, each superhard bearing element 60 may be secured within a corresponding bearing element recess 56 defined in outer support ring 51. Inner bearing assembly 20 may comprise the same number or a different number of superhard bearing elements 30 in comparison with the number of superhard bearing elements 60 included in outer bearing assembly 50. Additionally, superhard bearing elements 30 may have substantially the same diameters as superhard bearing elements 60 or different diameters than superhard bearing elements 60.

Inner support ring 21 and outer support ring 51 may each be made from a variety of different materials. For example, inner support ring 21 and/or outer support ring 51 may comprise a metallic material (e.g., carbon steel, tungsten or tungsten alloys, aluminum or aluminum alloys, or stainless steel, etc.), a carbide material (e.g., tungsten carbide, silicon carbide, etc.), or any other suitable material. In some embodiments, inner support ring 21 and/or outer support ring 51 may be made of a material with relatively high thermal conductivity (e.g., tungsten carbide or cobalt-cemented tungsten carbide). Superhard bearing elements 30 may each abut or contact inner support ring 21 over a selected (e.g., a substantial) surface area of the superhard bearing element 30 in order to promote heat transfer from the superhard bearing element 30 to inner support ring 21. Additionally, superhard bearing elements 60 may each abut or contact outer support ring 51 over a selected (e.g., a substantial) surface area of the superhard bearing element 60 in order to promote heat transfer from the superhard bearing element 60 to outer support ring 51.

In some embodiments, inner support ring 21 and/or outer support ring 51 may include an erosion-resistant and/or abrasion-resistant coating applied thereto. For example, an erosion-resistant and abrasion resistant coating may include a coating including, for example, a urethane rubber or other suitable coating, without limitation. In other embodiments, a hardfacing coating (e.g., tungsten carbide hardfacing) may be applied to inner support ring 21 and/or outer support ring 51 by any suitable method, including, without limitation, flame spraying, welding HVOF (high velocity oxy-fuel coating spraying), and/or laser cladding.

According to at least one embodiment, superhard bearing elements 30 may be positioned and oriented on inner support ring 21 and superhard bearing elements 60 may be positioned and oriented on outer support ring 51 such that superhard bearing surfaces 34 of superhard bearing elements 30 contact opposing superhard bearing surfaces 64 of superhard bearing elements 60. Accordingly, when inner bearing assembly 20 and outer bearing assembly 50 are assembled together, superhard bearing surfaces 34 of superhard bearing elements 30 and the opposing superhard bearing surfaces 64 of superhard bearing elements 60 may bear against each other and move relative to each other as inner bearing assembly 20 rotates relative to outer bearing assembly 50. As will be described in greater detail below with reference to FIGS. 3A-6B, superhard bearing elements 30 and superhard bearing elements 60 may comprise various surface shapes and configurations for achieving desired contact and freedom of movement between opposing superhard bearing surfaces.

As illustrated in FIG. 1, superhard bearing elements 30 may be mounted within bearing element recesses 26 defined in inner support ring 21. Superhard bearing elements 30 may each extend radially outward from inner support ring 21 such that at least a portion of the superhard bearing element 30 extends past outer surface 22 of inner support ring 21. According to at least one embodiment, a portion of superhard bearing element 30 extending from inner support ring 21 may comprise a superhard bearing surface 34. Superhard bearing surface 34 may comprise any suitable shape, without limitation. For example, superhard bearing surface 34 may comprise a rounded convex surface. In some embodiments, superhard bearing surface 34 may comprise a partial-ellipsoidal or cylindrical surface shape. In additional embodiments, superhard bearing surface 34 may comprise a partial-spherical surface shape.

Additionally, superhard bearing elements 60 may be mounted within bearing element recesses 56 defined in outer support ring 51. Superhard bearing elements 60 may each extend radially inward from outer support ring 51 such that at least a portion of the superhard bearing element 60 extends past inner surface 54 of outer support ring 51. According to at least one embodiment, a portion of superhard bearing element 60 extending from outer support ring 51 may comprise a superhard bearing surface 64. Superhard bearing surface 64 may comprise any suitable shape, without limitation. For example, superhard bearing surface 64 may comprise a rounded concave surface.

In some embodiments, superhard bearing surface 64 may comprise a partial-cylindrical surface shape having a radius of curvature conforming to a partial-ellipsoidal surface shape of a superhard bearing surface 34 on inner bearing assembly 20. In additional embodiments, superhard bearing surface 64 may alternatively comprise a partial-ellipsoidal surface shape, such as a partial-spherical shape, conforming to a partial-ellipsoidal surface shape of a superhard bearing surface 34 on inner bearing assembly 20 (see, e.g., superhard bearing element 160 illustrated in FIGS. 5A and 5B). In at least one embodiment, one or more superhard bearing surfaces 64 may each comprise a generally planar surface having a region that is configured to contact superhard bearing surfaces 34 on inner bearing assembly 20 (see, e.g., superhard bearing element 260 illustrated in FIGS. 6A and 6B).

Figure 3A:
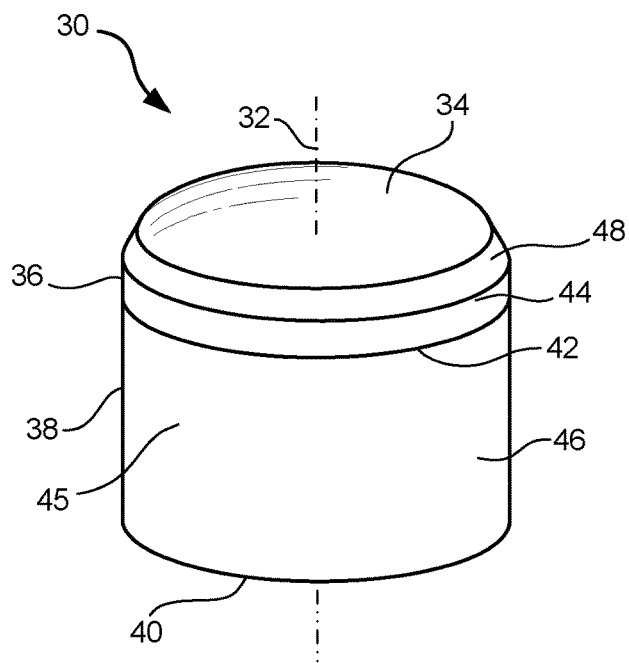
FIG. 3A is a perspective view of an exemplary superhard bearing element including a substrate and a superhard table according to at least one embodiment.
Figure 3B:
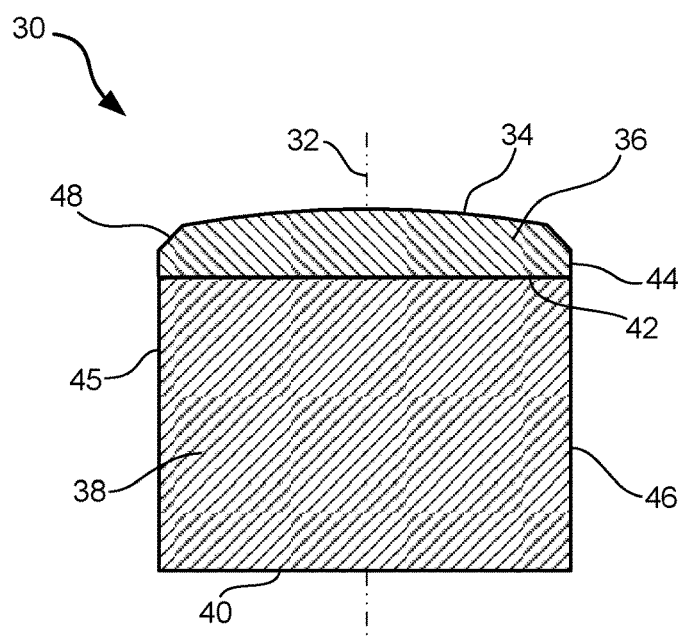
FIG. 3B is a cross-sectional side view of the exemplary superhard bearing element shown in FIG. 3A.

FIGS. 3A and 3B show an exemplary superhard bearing element 30 configured to be coupled to inner support ring 21. FIG. 3B illustrates a cross-sectional side view of the exemplary superhard bearing element 30 shown in FIG. 3A. As illustrated in FIGS. 3A and 3B, superhard bearing element 30 may comprise a superhard table 36 affixed to or formed upon a substrate 38. Superhard table 36 may be affixed to substrate 38 at interface 42. Superhard bearing element 30 may comprise a rear surface 40, a superhard bearing surface 34, and an element side surface 45. In some embodiments, element side surface 45 may include a substrate side surface 46 formed by substrate 38 and a superhard side surface 44 formed by superhard table 36. Rear surface 40 may be formed by substrate 38.

Superhard bearing element 30 may also include a chamfer 48 at the intersection of superhard side surface 44 and superhard bearing surface 34. Chamfer 48 may comprise an angular, sloped, and/or rounded edge formed at the intersection of superhard side surface 44 and superhard bearing surface 34. Any suitable surface shape may be formed at the intersection of superhard side surface 44 and superhard bearing surface 34, such as those disclosed in U.S. Pat. No. 8,708,564, the disclosure of which is incorporated herein, in its entirety, by this reference. Any other suitable surface shape may also be formed at the intersection of superhard side surface 44 and superhard bearing surface 34, including, without limitation, an arcuate surface (e.g., a radius, an ovoid shape, or any other rounded shape), a sharp edge, multiple chamfers/radii, a honed edge, and/or combinations of the foregoing.

Superhard bearing element 30 may comprise any suitable size, shape, and/or geometry, without limitation. As shown in FIGS. 3A and 3B, superhard bearing surface 34 may comprise a convex, partial-ellipsoidal or substantially partial-ellipsoidal surface shape. Accordingly, a cross-sectional view of superhard bearing element 30 taken along a plane parallel to central element axis 32 may have a convex, partial-circular or substantially partial-circular profile for superhard bearing surface 34 as shown in FIG. 3B. In some embodiments, superhard bearing surface 34 may comprise a partial-spherical or substantially partial-spherical surface shape. In such embodiments, each cross-sectional view of superhard bearing element 30 taken along a plane parallel to central element axis 32 may have substantially the same or similar profile.

According to various embodiments, at least a portion of superhard bearing element 30 may have a substantially cylindrical shape. For example, superhard bearing element 30 may comprise a substantially cylindrical outer surface surrounding a central element axis 32 extending through superhard bearing element 30, as illustrated in FIGS. 3A and 3B. For example, substrate side surface 46 and superhard side surface 44 may be substantially cylindrical and may have any suitable diameters relative to central element axis 32, without limitation. According to various embodiments, substrate side surface 46 and superhard side surface 44 may have substantially the same outer diameter relative to central element axis 32.

Substrate 38 may comprise any suitable material on which superhard table 36 may be formed. In at least one embodiment, substrate 38 may comprise a cemented carbide material, such as a cobalt-cemented tungsten carbide material and/or any other suitable material. In some embodiments, substrate 38 may include a suitable metal-solvent catalyst material, such as, for example, cobalt, nickel, iron, and/or alloys thereof. Substrate 38 may also include any suitable material including, without limitation, cemented carbides such as titanium carbide, tungsten carbide, niobium carbide, tantalum carbide, vanadium carbide, chromium carbide, and/or combinations of any of the preceding carbides cemented with iron, nickel, cobalt, and/or alloys thereof. Superhard table 36 may be formed of any suitable superabrasive and/or superhard material or combination of materials, including, for example PCD. Any of the superhard tables disclosed herein may also comprise polycrystalline diamond materials, such as those disclosed in U.S. Pat. No. 7,866,418, the disclosure of which is incorporated herein, in its entirety, by this reference. According to additional embodiments, superhard table 36 may comprise cubic boron nitride, silicon carbide, polycrystalline diamond, and/or mixtures or composites including one or more of the foregoing materials, without limitation.

FIG. 4A-4C show an exemplary superhard bearing element 60 configured to be coupled to outer support ring 51. As illustrated in FIGS. 4A-4C, superhard bearing element 60 may comprise a superhard table 66 affixed to or formed upon a substrate 68. Superhard table 66 may be affixed to substrate 68 at interface 72. Superhard bearing element 60 may comprise a rear surface 70, a superhard bearing surface 64, and an element side surface 75. In some embodiments, element side surface 75 may include a substrate side surface 76 formed by substrate 68 and a superhard side surface 74 formed by superhard table 66. Rear surface 70 may be formed by substrate 68.

Figure 6A:
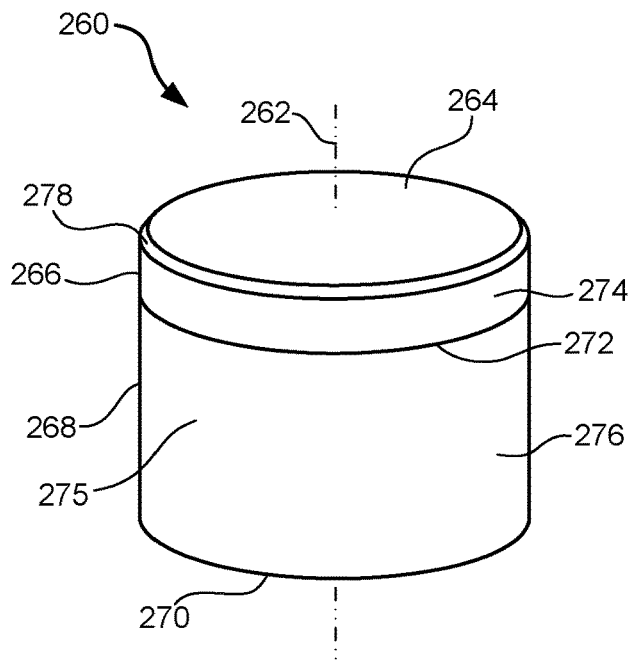
FIG. 6A is a perspective view of an exemplary superhard bearing element including a substrate and a superhard table according to at least one embodiment.
Figure 6B:
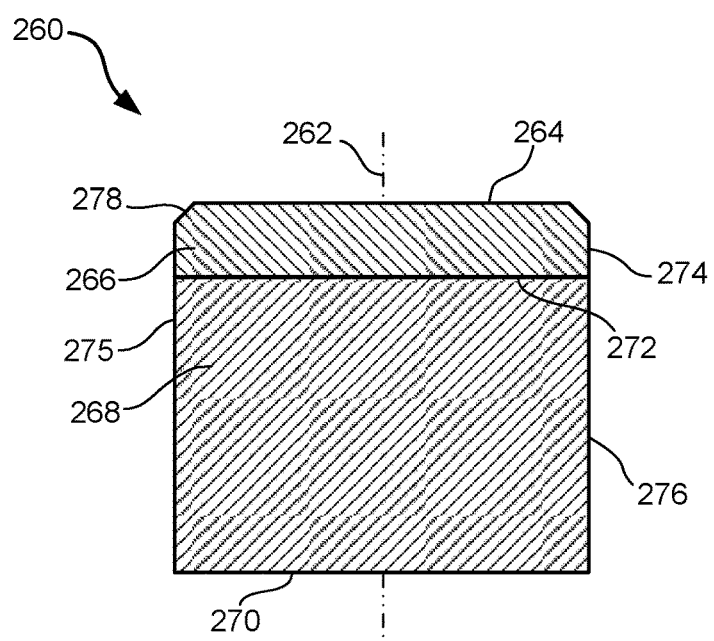
FIG. 6B is a cross-sectional side view of the exemplary superhard bearing element shown in FIG. 6A.

Superhard bearing element 60 may also include a chamfer 78 at the intersection of superhard side surface 74 and superhard bearing surface 64. Chamfer 78 may comprise an angular and/or rounded edge formed at the intersection of superhard side surface 74 and superhard bearing surface 64. In some embodiments, a chamfer (i.e., sloped or angled as shown in FIGS. 6A and 6B) may be formed by superhard table 66 at the intersection of superhard side surface 74 and superhard bearing surface 64. Any other suitable surface shape may also be formed at the intersection of superhard side surface 74 and superhard bearing surface 64, including, without limitation, an arcuate surface (e.g., a radius, an ovoid shape, or any other rounded shape), a sharp edge, multiple chamfers/radii, a honed edge, and/or combinations of the foregoing.

Superhard bearing element 60 may comprise any suitable size, shape, and/or geometry, without limitation. As shown in FIGS. 4A-4C, superhard bearing surface 64 may comprise a concave surface shape following a partial-cylindrical or substantially partial-cylindrical surface profile. Accordingly, various cross-sectional views of superhard bearing element 60 taken along a plane parallel to central element axis 62 may have a concave profile. For example, FIG. 4B illustrates a cross-sectional view of superhard bearing element 60 cut along the 4B-4B plane of FIG. 4A. As shown in FIG. 4B, superhard bearing surface 64 of superhard bearing element 60 may have a concave, partial-circular or substantially partial-circular profile. FIG. 4C illustrates another cross-sectional view of superhard bearing element 60 cut along the 4C-4C plane of FIG. 4A. As shown in FIG. 4C, superhard bearing surface 64 of superhard bearing element 60 may have a substantially linear cross-sectional profile.

According to various embodiments, at least a portion of superhard bearing element 60 may have a substantially cylindrical shape. For example, superhard bearing element 60 may comprise a substantially cylindrical outer surface surrounding a central element axis 62 extending through superhard bearing element 60, as illustrated in FIGS. 4A-4C. For example, substrate side surface 76 and superhard side surface 74 may be substantially cylindrical and may have any suitable diameters relative to central element axis 62, without limitation. According to various embodiments, substrate side surface 76 and superhard side surface 74 may have substantially the same outer diameter relative to central element axis 62.

Substrate 68 may comprise any suitable material on which superhard table 66 may be formed. In at least one embodiment, substrate 68 may comprise a cemented carbide material, such as a cobalt-cemented tungsten carbide material and/or any other suitable material. In some embodiments, substrate 68 may include a suitable metal-solvent catalyst material, such as, for example, cobalt, nickel, iron, and/or alloys thereof. Substrate 68 may also include any suitable material including, without limitation, cemented carbides such as titanium carbide, tungsten carbide, niobium carbide, tantalum carbide, vanadium carbide, chromium carbide, and/or combinations of any of the preceding carbides cemented with iron, nickel, cobalt, and/or alloys thereof. Superhard table 66 may be formed of any suitable superabrasive and/or superhard material or combination of materials, including, for example PCD. According to additional embodiments, superhard table 66 may comprise cubic boron nitride, silicon carbide, polycrystalline diamond, and/or mixtures or composites including one or more of the foregoing materials, without limitation.

Superhard table 36 of superhard bearing element 30 and/or superhard table 66 of superhard bearing element 60 may be formed using any suitable technique. According to some embodiments, superhard table 36 and/or superhard table 66 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., sp3-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution.

Following sintering, various materials, such as a metal-solvent catalyst, remaining in interstitial regions within the as-sintered PCD body may reduce the thermal stability of superhard table 36 and/or superhard table 66 at elevated temperatures. In some examples, differences in thermal expansion coefficients between diamond grains in the as-sintered PCD body and a metal-solvent catalyst in interstitial regions between the diamond grains may weaken portions of superhard table 36 and/or superhard table 66 that are exposed to elevated temperatures, such as temperatures developed during bearing operation. The weakened portions of superhard table 36 and/or superhard table 66 may become excessively worn and/or damaged during bearing operation.

Removing the metal-solvent catalyst and/or other materials from the as-sintered PCD body may improve the heat resistance and/or thermal stability of superhard table 36 and/or superhard table 66, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superhard table 36 and/or superhard table 66. Removing a metal-solvent catalyst from the as-sintered PCD body may reduce damage to the PCD material of superhard table 36 and/or superhard table 66 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form superhard table 36 and/or superhard table 66 comprising a PCD table. For example, the as-sintered PCD body may be immersed in or exposed to the acid for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superhard table 36 and/or superhard table 66. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superhard table 36 and/or superhard table 66 unleached. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, at least a portion of superhard table 36 and/or superhard table 66 may comprise a volume of PCD material that is substantially free of a metal-solvent catalyst.

The plurality of diamond particles used to form superhard table 36 and/or superhard table 66 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 15 μm, 12 μm, 10 μm, 8 μm, 4 μm, 2 μm, 1 μm, 0.5 μm, less than 0.5 μm, 0.1 μm, less than 0.1 μm). In another embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation.

Figure 5A:
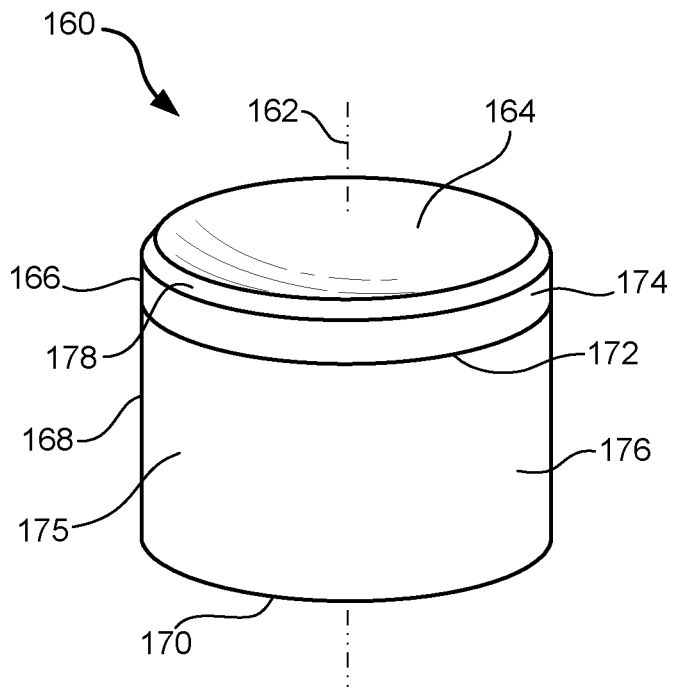
FIG. 5A is a perspective view of an exemplary superhard bearing element including a substrate and a superhard table according to at least one embodiment.
Figure 5B:
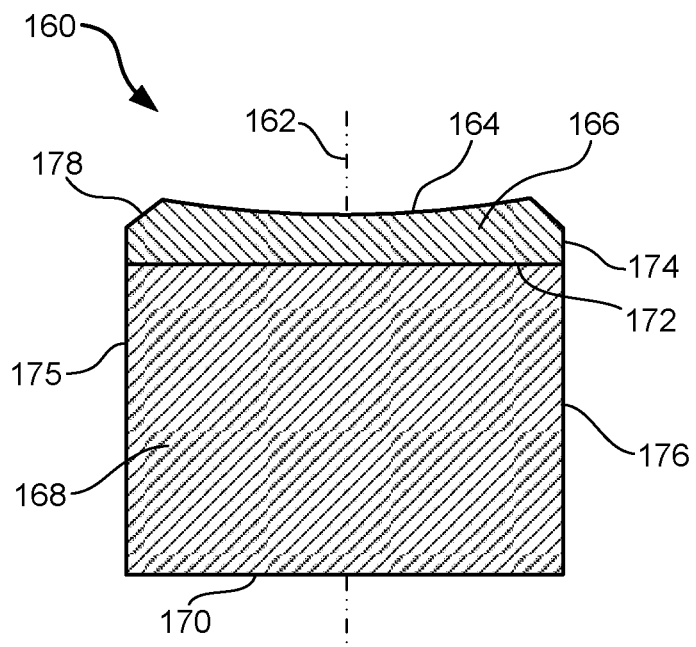
FIG. 5B is a cross-sectional side view of the exemplary superhard bearing element shown in FIG. 5A.

FIGS. 5A and 5B illustrate an exemplary superhard bearing element 160 configured to be coupled to an outer support ring, such as outer support ring 51 shown in FIGS. 1 and 2. As illustrated in FIGS. 5A and 5B, superhard bearing element 160 may comprise a superhard table 166 affixed to or formed upon a substrate 168. Superhard table 166 may be affixed to substrate 168 at interface 172. Superhard bearing element 160 may comprise a rear surface 170, a superhard bearing surface 164, and an element side surface 175. In some embodiments, element side surface 175 may include a substrate side surface 176 formed by substrate 168 and a superhard side surface 174 formed by superhard table 166. Rear surface 170 may be formed by substrate 168.

Superhard bearing element 160 may also include an chamfer 178 at the intersection of superhard side surface 174 and superhard bearing surface 164. Chamfer 178 may comprise an angular and/or rounded edge formed at the intersection of superhard side surface 174 and superhard bearing surface 164. In some embodiments, a chamfer (i.e., sloped or angled as shown in FIGS. 6A and 6B) may be formed by superhard table 166 at the intersection of superhard side surface 174 and superhard bearing surface 164. Any other suitable surface shape may also be formed at the intersection of superhard side surface 174 and superhard bearing surface 164, including, without limitation, an arcuate surface (e.g., a radius, an ovoid shape, or any other rounded shape), a sharp edge, multiple chamfers/radii, a honed edge, and/or combinations of the foregoing.

Superhard bearing element 160 may comprise any suitable size, shape, and/or geometry, without limitation. As shown in FIGS. 5A and 5B, superhard bearing surface 164 may comprise a concave surface shape exhibiting a partial-ellipsoidal or substantially partial-ellipsoidal surface profile. Accordingly, each cross-sectional view of superhard bearing element 160 taken along a plane parallel to central element axis 162 may have a convex, arcuate profile, such as a partial-circular profile, for superhard bearing surface 164 as shown in FIG. 5B. In some embodiments, superhard bearing surface 164 may comprise a partial-spherical or substantially partial-spherical surface shape. In such embodiments, each cross-sectional view of superhard bearing element 160 taken along a plane parallel to central element axis 162 may have substantially the same or similar profile.

According to various embodiments, at least a portion of superhard bearing element 160 may have a substantially cylindrical shape. For example, superhard bearing element 160 may comprise a substantially cylindrical outer surface surrounding a central element axis 162 extending through superhard bearing element 160, as illustrated in FIGS. 5A and 5B. For example, substrate side surface 176 and superhard side surface 174 may be substantially cylindrical and may have any suitable diameters relative to central element axis 162, without limitation. According to various embodiments, substrate side surface 176 and superhard side surface 174 may have substantially the same outer diameter relative to central element axis 162.

Superhard table 166 and substrate 168 of superhard bearing element 160 may be formed of any suitable material and using any suitable technique, without limitation; including, for example, the materials and techniques discussed above in reference to superhard table 66 and substrate 68 (see, e.g., FIGS. 4A-4C).

FIGS. 6A and 6B illustrate an exemplary superhard bearing element 260 configured to be coupled to an outer support ring of a radial-bearing assembly, such as outer support ring 51 shown in FIGS. 1 and 2. As illustrated in FIGS. 6A and 6B, superhard bearing element 260 may comprise a superhard table 266 affixed to or formed upon a substrate 268. Superhard table 266 may be affixed to substrate 268 at interface 272. Superhard bearing element 260 may comprise a rear surface 270, a superhard bearing surface 264, and an element side surface 275. In some embodiments, element side surface 275 may include a substrate side surface 276 formed by substrate 268 and a superhard side surface 274 formed by superhard table 266. Rear surface 270 may be formed by substrate 268.

In at least one embodiment, superhard bearing element 260 may also include a chamfer 278 (i.e., sloped or angled as shown in FIGS. 6A and 6B) at the intersection of superhard side surface 274 and superhard bearing surface 264. Any other suitable surface shape may also be formed at the intersection of superhard side surface 274 and superhard bearing surface 264, including, without limitation, an arcuate surface (e.g., a radius, an ovoid shape, or any other rounded shape), a sharp edge, multiple chamfers/radii, a honed edge, and/or combinations of the foregoing. In various embodiments, any of the superhard bearing elements 30, 60, and/or 160 illustrated and discussed herein may comprise a chamfer formed at the intersections of the respective superhard side surface and bearing surface (see, e.g., FIGS. 3A-5B).

Superhard bearing element 260 may comprise any suitable size, shape, and/or geometry, without limitation. For example, as shown in FIGS. 6A and 6B, superhard bearing surface 264 may comprise a planar or substantially planar surface. According to various embodiments, at least a portion of superhard bearing element 260 may have a substantially cylindrical shape. For example, superhard bearing element 260 may comprise a substantially cylindrical outer surface surrounding a central element axis 262 extending through superhard bearing element 260, as illustrated in FIGS. 6A and 6B. For example, substrate side surface 276 and superhard side surface 274 may be substantially cylindrical and may have any suitable diameters relative to central element axis 262, without limitation. According to various embodiments, substrate side surface 276 and superhard side surface 274 may have substantially the same outer diameter relative to central element axis 262.

Superhard table 266 and substrate 268 of superhard bearing element 260 may be formed of any suitable material and using any suitable technique, without limitation; including, for example, the materials and techniques discussed above in reference to superhard table 66 and substrate 68 (see, e.g., FIGS. 4A-4C).

Figure 7:
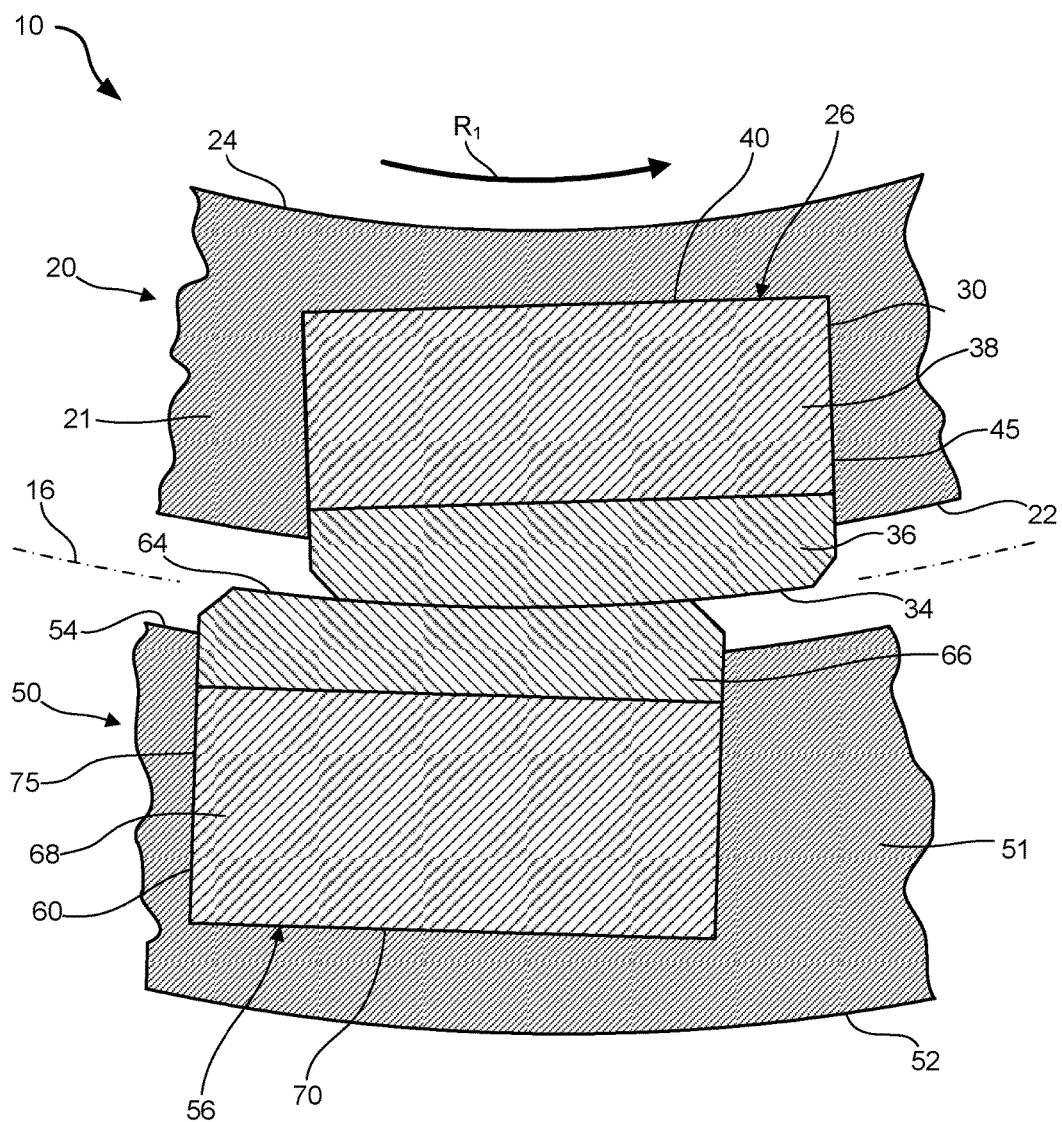
FIG. 7 is a cut-away cross-sectional top view of a portion of a radial-bearing apparatus according to at least one embodiment.

FIG. 7 is a cut-away cross-sectional top view of a portion of radial-bearing apparatus 10 according to at least one embodiment. Radial-bearing apparatus 10 may include a rotor or inner bearing assembly 20 and a stator or outer bearing assembly 50 configured according to any of the embodiments or features associated with radial-bearing apparatus 10 shown in FIGS. 1 and 2.

Inner bearing assembly 20 may include a plurality of superhard bearing elements 30 distributed circumferentially about a central bearing axis 12 (see FIGS. 1 and 2), with superhard bearing surfaces 34 that oppose and bear against respective superhard bearing surfaces 64 of the superhard bearing elements 60 of outer bearing assembly 50 during use. As shown in FIG. 7, superhard bearing surface 34 of superhard bearing element 30 may comprise a convex (e.g., partial-ellipsoidal, partial-spherical or -partial cylindrical) surface that opposes and bears against a superhard bearing surface 64 of superhard bearing element 60 having a concave bearing surface (e.g., partial-ellipsoidal, partial-spherical or partial-cylindrical). For example, superhard bearing element 60 may have a superhard bearing surface 64 comprising a partial-cylindrical surface shape with a radius of curvature conforming to the partial-ellipsoidal surface shape of a superhard bearing surface 34 on inner bearing assembly 20. In some embodiments, a superhard bearing element having a bearing surface comprising a partial-ellipsoidal surface shape (e.g., superhard bearing element 160 illustrated in FIGS. 5A and 5B) may be disposed in outer bearing assembly 50 such that the partial-ellipsoidal surface conforms to and bears against superhard bearing surface 34 of superhard bearing element 30.

According to at least one embodiment, inner bearing assembly 20 may rotate about central bearing axis 12 in rotational direction $R_1$ while outer bearing assembly 50 remains stationary. As inner bearing assembly 20 rotates in rotational direction $R_1$, a portion of superhard bearing surface 34 of superhard bearing element 30 may conform to or lie upon a circumferential path 16, which is circumferentially centered about central bearing axis 12. Additionally, a portion of superhard bearing surface 34 may have substantially the same curvature as circumferential path 16. Circumferential path 16 may have a diameter that is greater than the diameter of outer surface 22 of inner support ring 21 and that is less than the diameter of inner surface 54 of an outer support ring 51. As illustrated in FIG. 7, a portion of superhard bearing surface 64 of superhard bearing element 60 may bear against superhard bearing surface 34, may be arranged along circumferential path 16, and may have substantially the same curvature as circumferential path 16. Therefore, as inner bearing assembly 20 rotates in rotational direction $R_1$, inner bearing assembly 20 may rotate freely while at least one of superhard bearing elements 30 opposes and bears against at least one of superhard bearing elements 60.

In some embodiments, the center of curvature of one or more of the superhard bearing surfaces 34 of superhard bearing elements 30 may not be substantially coincident with each other after being assembled with inner support ring 21. Superhard bearing surfaces 34 may be machined (e.g., by a grinding process or electro-discharge machining) after or prior to being assembled with inner support ring 21 so that superhard bearing surfaces 34 exhibit a center of curvature that is substantially coincident with each other and with circumferential path 16. Moreover, superhard bearing surfaces 64 may be machined (e.g., by a grinding process, laser process, or electro-discharge machining) after or prior to being assembled with outer support ring 51 so that superhard bearing surfaces 64 exhibit a center of curvature that is substantially coincident with each other and with circumferential path 16.

Figure 8:
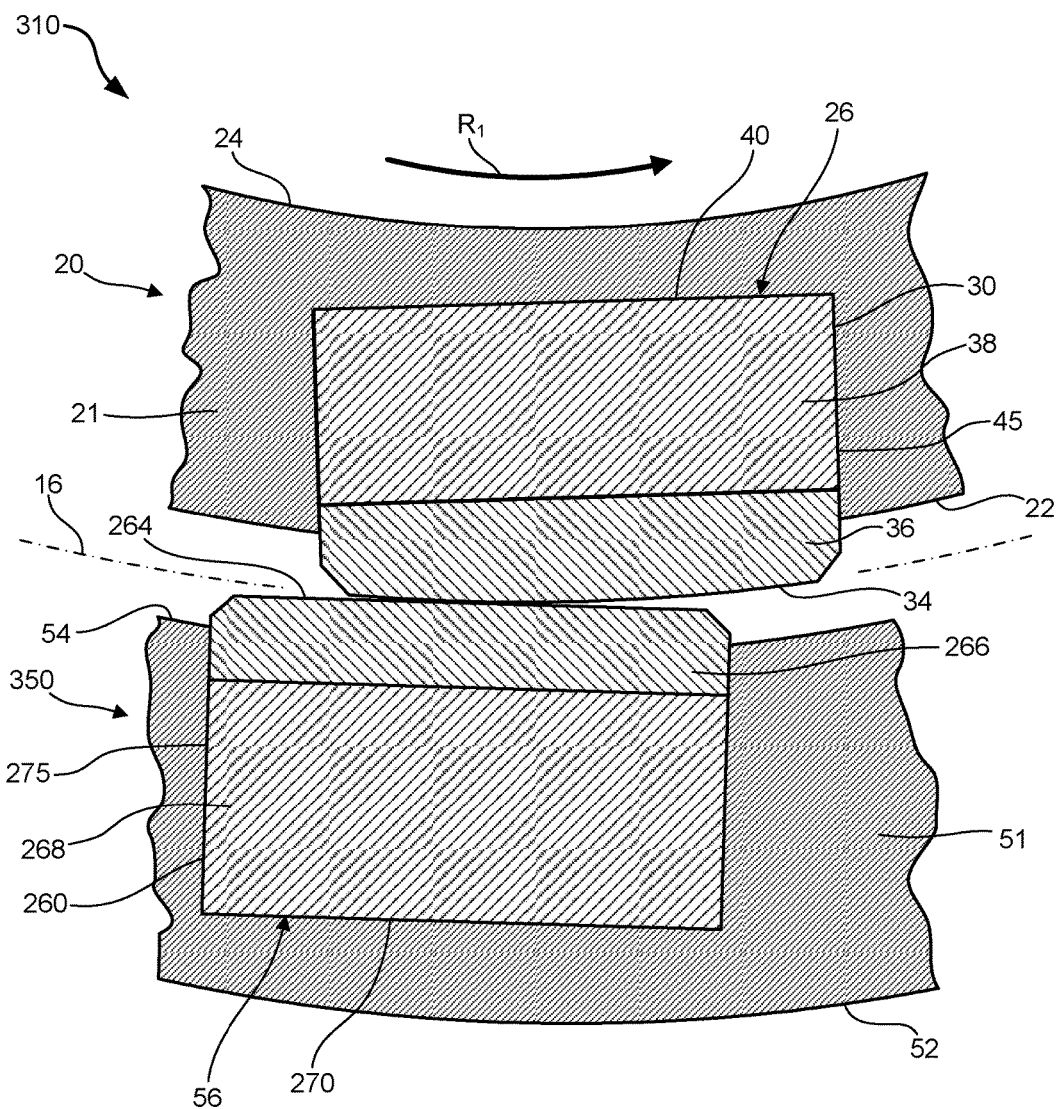
FIG. 8 is a cut-away cross-sectional top view of a portion of a radial-bearing apparatus according to at least one embodiment.

FIG. 8 is a cut-away cross-sectional top view of a portion of radial-bearing apparatus 310 according to an additional embodiment. Radial-bearing apparatus 310 may include a rotor or inner bearing assembly 20 and a stator or outer bearing assembly 350. As shown in FIG. 8, superhard bearing surface 34 of superhard bearing element 30 may comprise a convex bearing surface (e.g., partial-ellipsoidal) that opposes and bears against or contacts a portion of a superhard bearing surface 264 of superhard bearing element 260 having a substantially planar surface shape (see, e.g., superhard bearing element 260 illustrated in FIGS. 6A and 6B).

As inner bearing assembly 20 rotates about a central bearing axis (e.g., central bearing axis 12 illustrated in FIG. 1) in rotational direction $R_1$, a portion of superhard bearing surface 34 of superhard bearing element 30 may follow a circumferential path 16, which is circumferentially centered about central bearing axis 12. Additionally, a portion of superhard bearing surface 34 may have substantially the same the curvature as circumferential path 16. As shown in FIG. 8, a portion of superhard bearing surface 264 of superhard bearing element 260 that bears against superhard bearing surface 234 may also be arranged along or near circumferential path 16. For example, a portion of planar superhard bearing surface 264 that bears against superhard bearing surface 34 of superhard bearing element 30 may substantially intersect circumferential path 16. Planar superhard bearing surface to 64 may, for example, tangentially intersect or tangentially touch (e.g., at one or more points) circumferential path 16. Generally, as inner bearing assembly 20 rotates in rotational direction $R_1$, inner bearing assembly 20 may rotate freely while at least one of superhard bearing elements 30 opposes and bears against at least one of superhard bearing elements 260.

Figure 9:
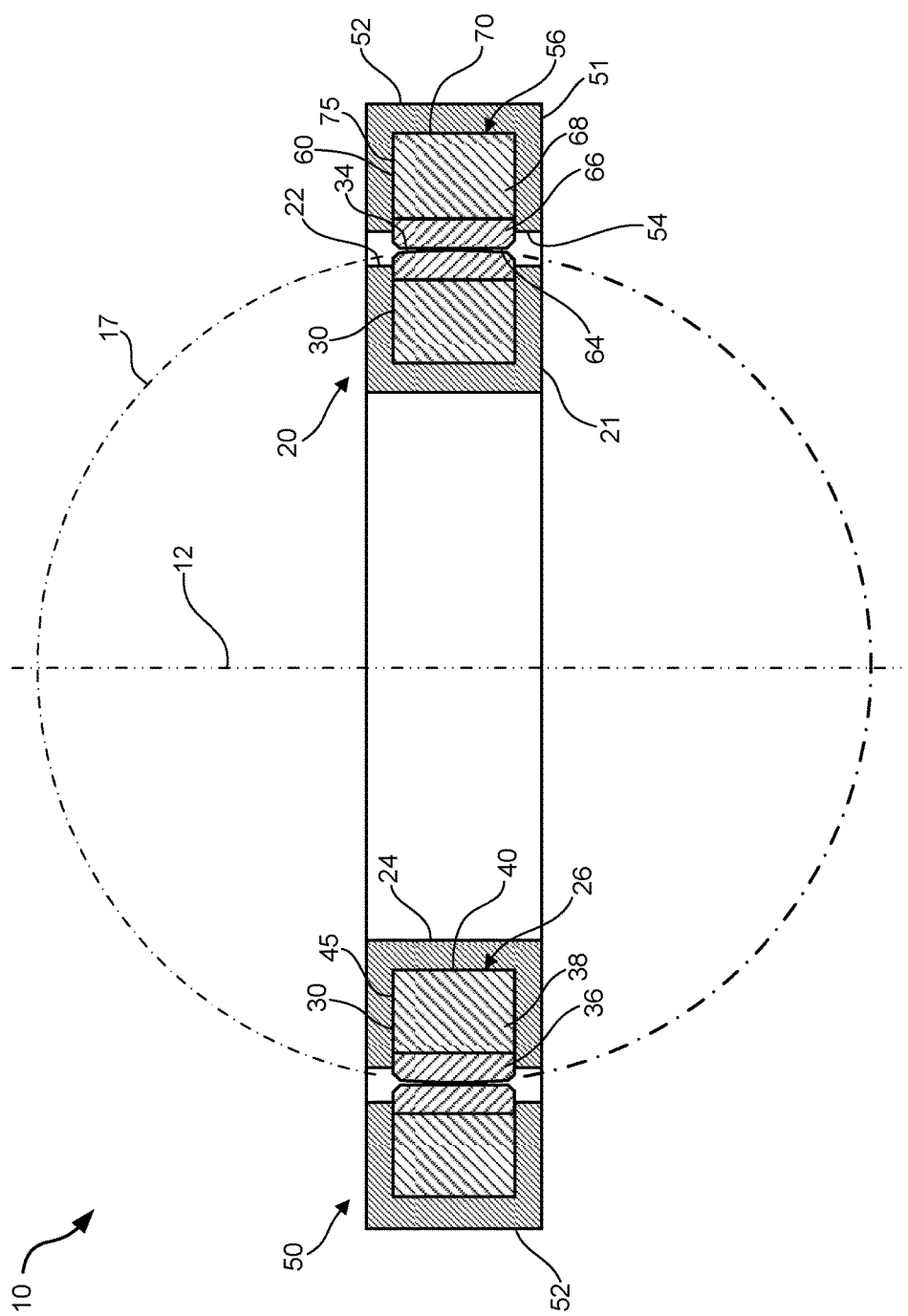
FIG. 9 is a cross-sectional side view of a radial-bearing apparatus according to at least one embodiment.

FIG. 9 is a cut-away cross-sectional side view of radial-bearing apparatus 10 according to various embodiments. Radial-bearing apparatus 10 may include a rotor or inner bearing assembly 20 and a stator or outer bearing assembly 50 configured according to any of the embodiments or features associated with radial-bearing apparatus 10 shown, for example, in FIGS. 1, 2, and 7.

According to some embodiments, inner bearing assembly 20 and outer bearing assembly 50 may both be aligned with each other and/or may be circumferentially centered about central bearing axis 12. As shown in FIG. 9, at least one of superhard bearing surfaces 34 of superhard bearing elements 30 may comprise a convex bearing surface (e.g., partial-ellipsoidal) that opposes and bears against at least one of a superhard bearing surfaces 64 of superhard bearing element 60 comprising a concave, partial-cylindrical surface shape with a radius of curvature conforming to the convex surface (e.g., partial-ellipsoidal) shape of superhard bearing surface 34. The partial-cylindrical surface shape of superhard bearing surface 64 may be oriented so as to generally conform to or lie upon circumferential path 16 (see, e.g., FIG. 7) while also extending in a direction generally parallel to central bearing axis 12.

As shown in FIG. 9, superhard bearing surfaces 34 of superhard bearing elements 30 may each comprise a convex surface shape (e.g., a partial-spherical or a partial-ellipsoidal shape), having substantially the same radius of curvature as spherical outline 17. Spherical outline 17 represents an outline (taken at the cross-section) of a conceptual sphere having a surface that passes over and substantially conforms to bearing surfaces 34 of each of bearing elements 30. As shown in FIG. 9, superhard bearing elements 30 may be positioned and oriented on inner bearing assembly 20 such that superhard bearing surfaces 34 substantially conform to spherical outline 17. As such, superhard bearing surfaces 34 may each comprise a partial-spherical surface that substantially conforms to a portion of spherical outline 17. Circumferential path 16 illustrated in FIG. 7 may also coincide with a circumferential portion of spherical outline 17. Further, at least a portion of bearing surfaces 64 of superhard bearing elements 60 may substantially conform to spherical outline 17. For example, bearing surfaces 64 having a partial-cylindrical surface shape may conform to spherical outline 17 along circumferential path 16.

As inner bearing assembly 20 rotates with respect to outer bearing assembly 50 about central bearing axis 12, superhard bearing surfaces 34 of superhard bearing elements 30 may remain substantially congruent with portions of spherical outline 17. Additionally, as will be discussed in greater detail below with respect to FIGS. 10-11, superhard bearing surfaces 34 of superhard bearing elements 30 may also be generally or substantially aligned or congruent with portions of spherical outline 17 when inner bearing assembly 20 tilts and rotates with respect to outer bearing assembly 50.

Figure 10:
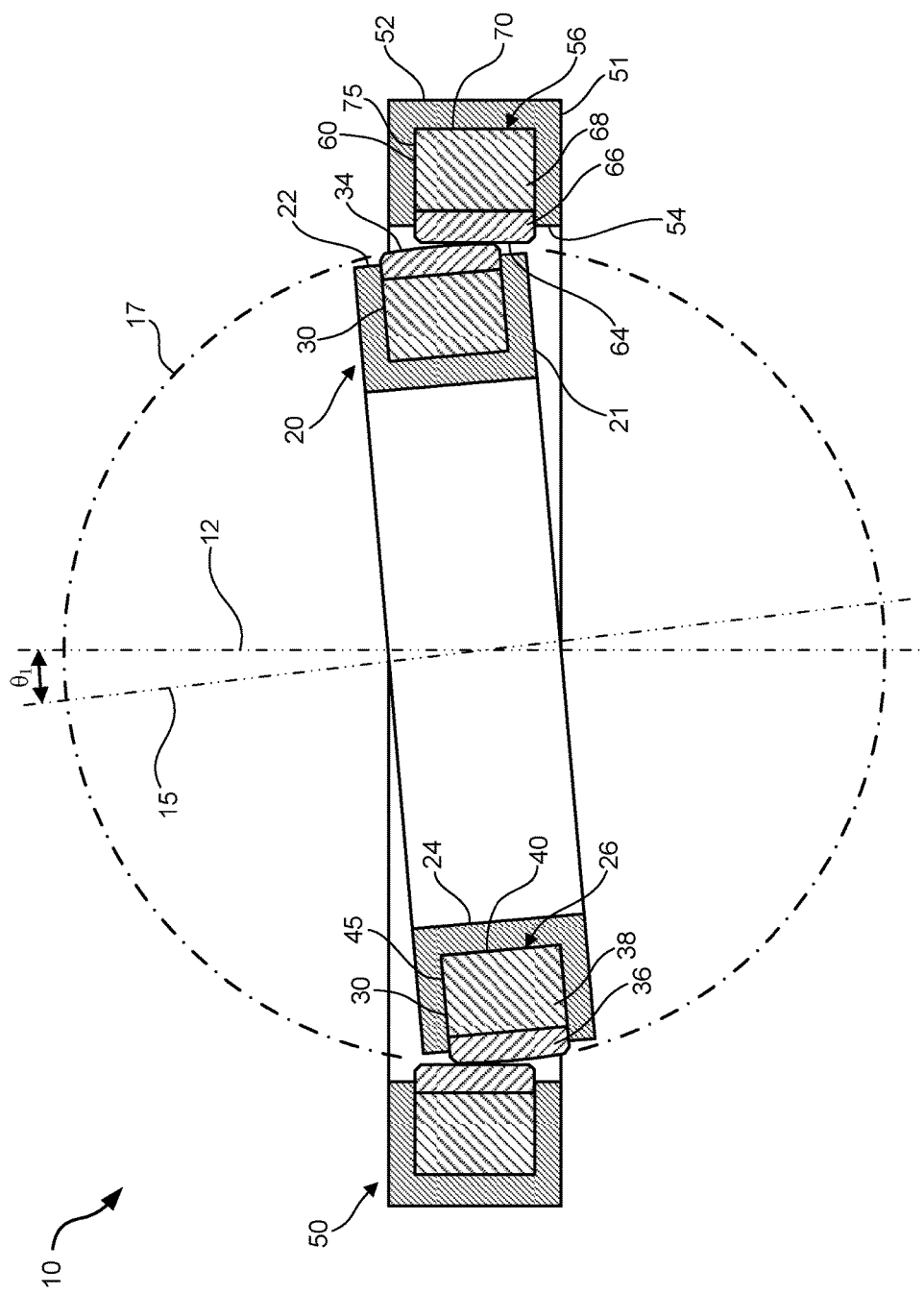
FIG. 10 is a cross-sectional side view of the exemplary radial-bearing apparatus shown in FIG. 9.
Figure 11:
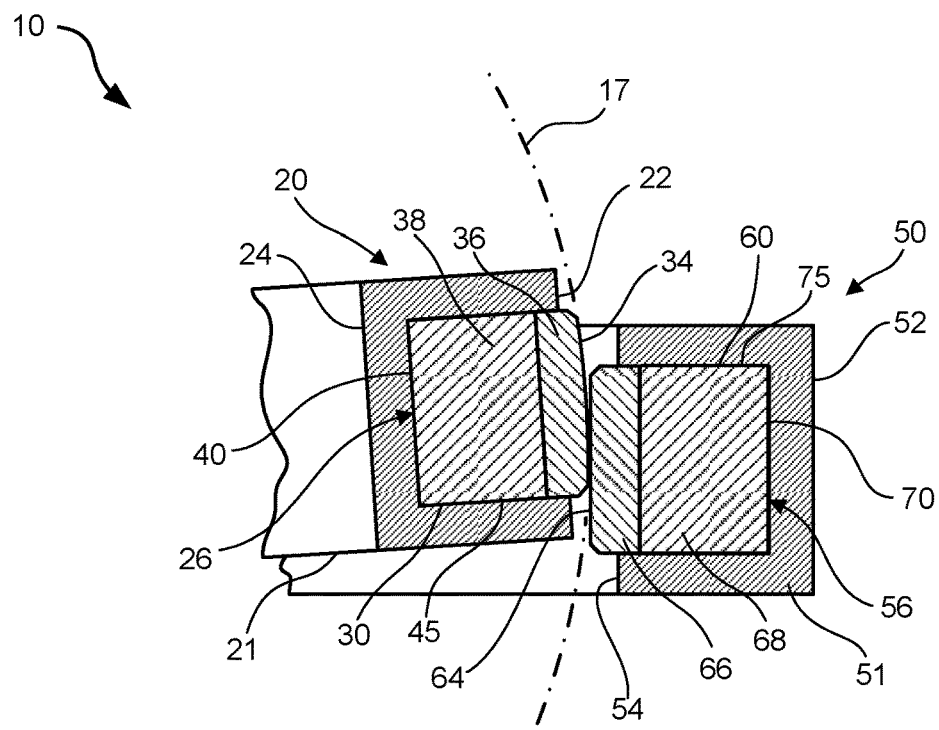
FIG. 11 is a cut-away cross-sectional side view of a portion of the exemplary radial-bearing apparatus shown in FIG. 10.

FIGS. 10 and 11 illustrate the exemplary radial-bearing apparatus 10 illustrated in FIG. 9 in a state in which inner bearing assembly 20 is tilted at an angle with respect to outer bearing assembly 50. As shown in FIGS. 10 and 11, inner bearing assembly 20 is tilted at an angle with respect to outer bearing assembly 50 such that inner bearing assembly 20 is circumferentially centered about a different axis than outer bearing assembly 50. For example, inner bearing assembly 20 may be circumferentially centered about central bearing axis 15, which is tilted at an angle $\theta_1$ with respect to central bearing axis 12 about which outer bearing assembly 50 is circumferentially centered.

While inner bearing assembly 20 is tilted with respect to outer bearing assembly 50, at least one of superhard bearing surfaces 34 of superhard bearing elements 30 may continue to bear against at least one of superhard bearing surfaces 64 of superhard bearing elements 60. For example, as shown in FIGS. 10 and 11, a different portion of a superhard bearing surface 34 than that shown in FIG. 9 may bear against the opposing superhard bearing surface 64. Because superhard bearing surfaces 34 of inner bearing assembly 20 substantially coincide with spherical outline 17 when inner bearing assembly 20 is in a tilted orientation, superhard bearing surfaces 34 may continue to move with respect to superhard bearing surfaces 64 of outer bearing assembly 50, allowing for rotation of inner bearing assembly 20 with respect to outer bearing assembly 50. For example, while inner bearing assembly 20 is tilted with respect to outer bearing assembly 50, inner bearing assembly 20 may rotate with respect to outer bearing assembly 50 about central bearing axis 15 while maintaining at least some bearing surface contact with outer bearing assembly 50. In some embodiments, while inner bearing assembly 20 is tilted with respect to outer bearing assembly 50, outer bearing assembly 50 may rotate with respect to inner bearing assembly 20 about central bearing axis 12 while maintaining at least partial bearing surface contact with inner bearing assembly 20.

Because inner bearing assembly 20 may continue to rotate with respect to outer bearing assembly 50, even when tilted with respect to outer bearing assembly 50, inner bearing assembly 20 as a whole may not generate significant uneven loading with respect to outer bearing assembly 50 during drilling due to such tilting. For example, as illustrated in FIG. 10, rather than inner bearing assembly 20 as a whole being forced in an axial direction along central bearing axis 12 relative to outer bearing assembly 50 in response to various forces during drilling (e.g., deflection of an output shaft coupled to inner bearing assembly 20), inner bearing assembly 20 may instead tilt with respect to outer bearing assembly 50 in such a manner that inner bearing assembly 20 experiences limited or no uneven loading due to tilting of inner bearing assembly 20 with respect to outer bearing assembly 50. In other words, while a portion of inner bearing assembly 20 may be tilted and thus displaced from outer bearing assembly 50 during drilling, a circumferentially opposite portion of inner bearing assembly 20 may likewise be tilted and displaced from outer bearing assembly 50 in an opposite direction such that inner bearing assembly 20 experiences little to no resistance to such tilting as a whole with respect to outer bearing assembly 50. Accordingly, an output shaft coupled to inner bearing assembly 20, or in some embodiments to outer bearing assembly 50, may be deflected during drilling without negatively impacting the loading of inner bearing assembly 20 with respect to outer bearing assembly 50 or vice versa.

FIG. 9-11 may also represent a radial-bearing apparatus (e.g., radial-bearing apparatus 310 illustrated in FIG. 8) having an outer bearing assembly that includes superhard bearing elements (e.g., superhard bearing elements 260) having substantially planar superhard bearing surfaces.

Figure 12:
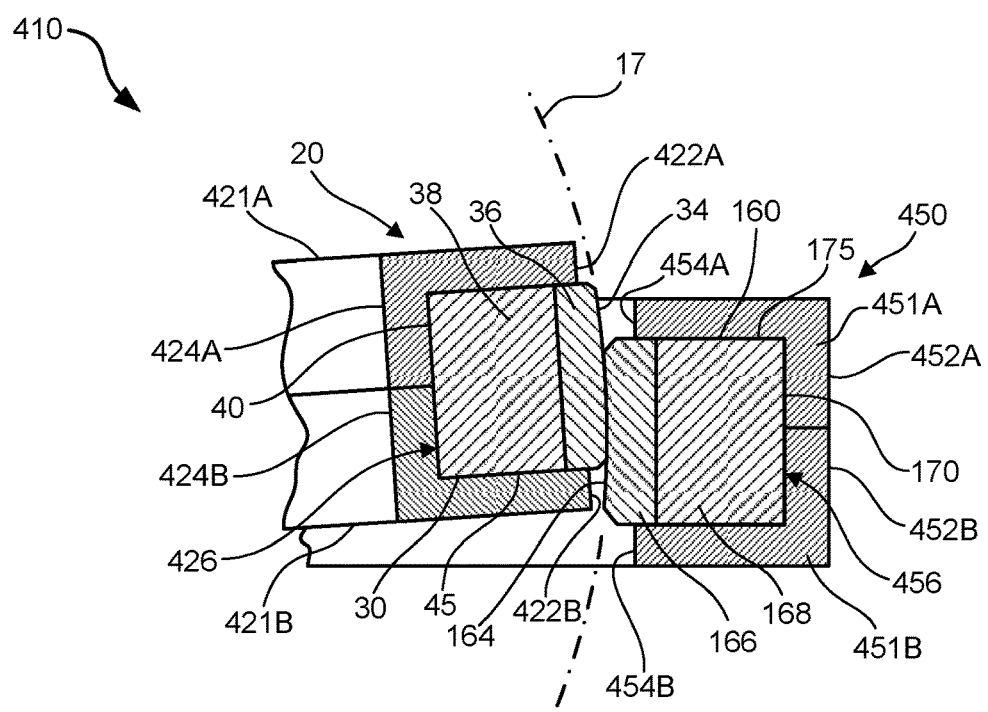
FIG. 12 is a cut-away cross-sectional side view of a portion of an exemplary radial-bearing apparatus according to at least one embodiment.

FIG. 12 is a cut-away cross-sectional side view of a portion of radial-bearing apparatus 410 according to an additional embodiment. Radial-bearing apparatus 410 may include a rotor or inner bearing assembly 20 and a stator or outer bearing assembly 450. As shown in FIG. 12, superhard bearing surface 34 of superhard bearing element 30 may comprise a convex surface (e.g., partial-ellipsoidal) that opposes and bears against at least a portion of a superhard bearing surface 164 of a superhard bearing element 160 having a concave surface shape (see, e.g., superhard bearing element 160 illustrated in FIGS. 5A and 5B) that substantially conforms to superhard bearing surface 34.

As shown in FIG. 12, inner bearing assembly 20 is tilted at an angle (e.g., angle $\theta_1$ shown in FIG. 10) with respect to outer bearing assembly 450 such that inner bearing assembly 20 is circumferentially centered about a different axis than outer bearing assembly 450. While inner bearing assembly 20 is tilted with respect to outer bearing assembly 450, superhard bearing surface 34 of superhard bearing element 30 may continue to bear against opposing superhard bearing surface 164 of superhard bearing element 160. Because superhard bearing surfaces 34 of inner bearing assembly 20 and superhard bearing surfaces 164 of outer bearing assembly 450 substantially conform to spherical outline 17, superhard bearing surfaces 34 may continue to move (e.g., freely) with respect to superhard bearing surfaces 164 of outer bearing assembly 450, allowing for rotation of inner bearing assembly 20 with respect to outer bearing assembly 450. For example, while inner bearing assembly 20 is tilted with respect to outer bearing assembly 450, inner bearing assembly 20 may rotate with respect to outer bearing assembly 450 about a central bearing axis (e.g., central bearing axis 15 illustrated in FIG. 10) while bearing against outer bearing assembly 450. In some embodiments, while inner bearing assembly 20 is tilted with respect to outer bearing assembly 450, outer bearing assembly 450 may rotate with respect to inner bearing assembly 20 about a central bearing axis (e.g., central bearing axis 12 illustrated in FIG. 10) while bearing against inner bearing assembly 20.

Because inner bearing assembly 20 may continue to rotate with respect to outer bearing assembly 450, even when tilted with respect to outer bearing assembly 450, inner bearing assembly 20 as a whole may not generate significant uneven loading with respect to outer bearing assembly 450 during drilling due to such tilting. Moreover, because superhard bearing surface 164 of superhard bearing element 160 comprises a concave surface shape (e.g., partial-ellipsoidal) that substantially conforms to the convex surface shape (e.g., partial-ellipsoidal) of superhard bearing surface 34 of superhard bearing element 30, a significant portion of superhard bearing surface 164 may remain in contact with superhard bearing surface 34 when inner bearing assembly 20 is tilted with respect to outer bearing assembly 450. Accordingly, a drilling shaft coupled to inner bearing assembly 20, or in some embodiments coupled to outer bearing assembly 50, may be deflected during drilling without significantly impacting the loading of inner bearing assembly 20 with respect to outer bearing assembly 50 or vice versa.

Figure 13A:
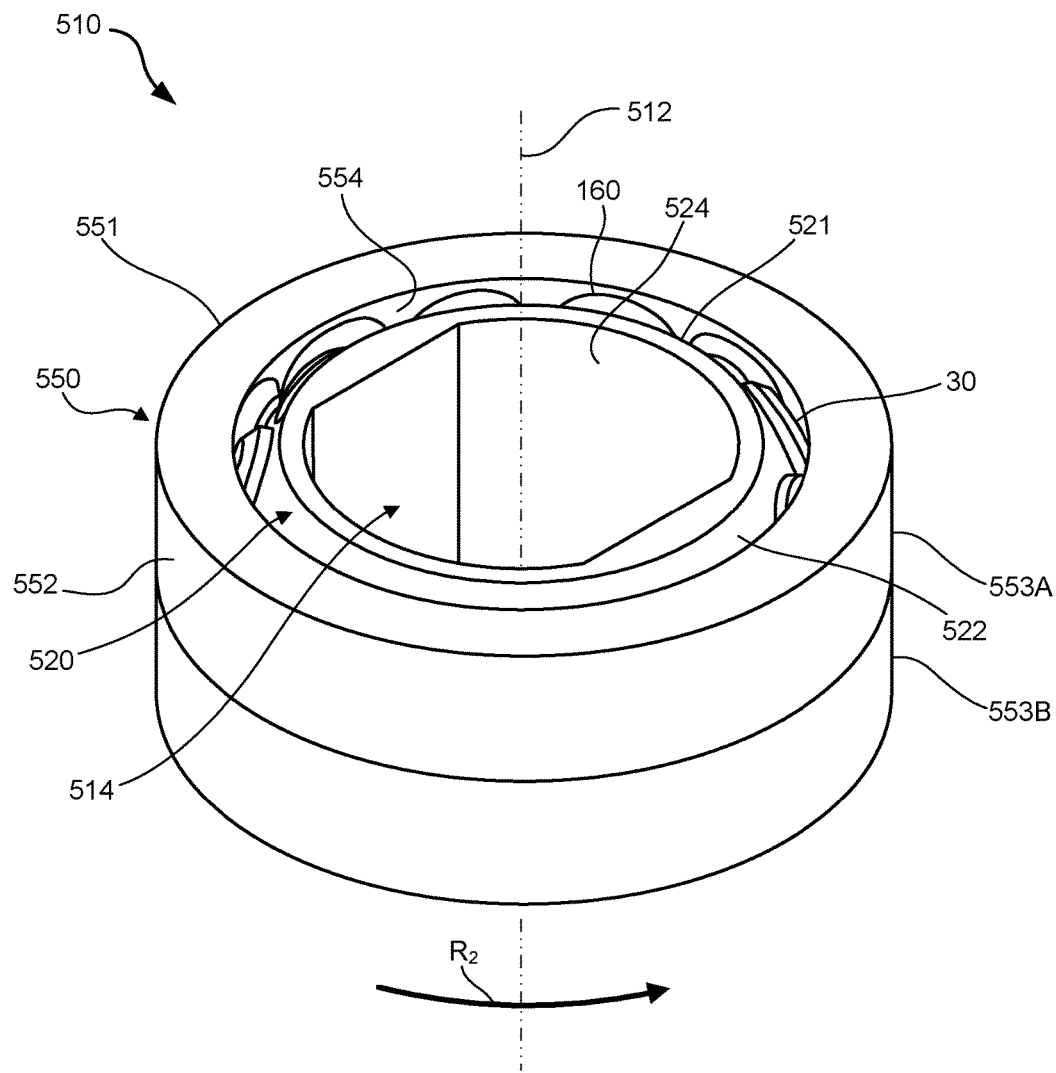
FIG. 13A is a perspective view of a radial-bearing apparatus according to at least one embodiment.

FIG. 13A illustrates an exemplary radial-bearing apparatus 510, or spherical-bearing apparatus, according to at least one embodiment. As illustrated in FIG. 13A, radial-bearing apparatus 510 may comprise an inner bearing assembly 520, or inner race, having a plurality of superhard bearing elements 530 coupled to an inner support ring 521. Radial-bearing apparatus 510 may additionally comprise an outer bearing assembly 550, or outer race, having a plurality of superhard bearing elements 560 coupled to an outer support ring 551. Either of inner bearing assembly 520 and outer bearing assembly 550 may be configured as a rotor or a stator, respectively. If, for example, outer bearing assembly 550 is configured to remain stationary, outer bearing assembly 550 may be referred to as the stator and the inner bearing assembly 520 may be referred to as the rotor that rotates relative to outer bearing assembly 550. Alternatively, inner bearing assembly 520 may be a stator configured to remain stationary and outer bearing assembly 550 may be a rotor configured to rotate relative to inner bearing assembly 520. According to various embodiments, inner bearing assembly 520 may be configured to rotate about central bearing axis 512 in rotational direction $R_2$ while outer bearing assembly 550 remains stationary.

Inner bearing assembly 520 and outer bearing assembly 550 may each be arranged circumferentially around a central bearing axis 512. Central bearing axis 512 may also comprise a rotational axis about which inner bearing assembly 520 or outer bearing assembly 550 rotates. However, as will be discussed in greater detail below in reference to FIGS. 16 and 17, a rotational axis of inner bearing assembly 520 and/or outer bearing assembly 550 may not be aligned with central bearing axis 512 at all times during operation. For example, during a drilling operation, outer bearing assembly 550 may be circumferentially centered about central bearing axis 512 while inner bearing assembly is circumferentially centered about and/or rotates about a rotational axis that is oriented at an angle with respect to central bearing axis 512. Inner support ring 521 may comprise an outer surface 522 facing outward and an inner surface 524 facing inward with respect to central bearing axis 512. Outer support ring 551 may comprise an outer surface 552 facing outward and an inner surface 554 facing inward with respect to central bearing axis 512. Radial-bearing assembly 510 may include an aperture 514 defined by inner surface 524 of inner support ring 521 that is configured to receive a shaft (e.g., a rotational motor shaft). Aperture 514 may be generally centered about central bearing axis 512.

In some embodiments, outer support ring 551 may comprise a plurality of ring members. For example, as illustrated in FIG. 13, outer support ring 551 may comprise a first outer ring member 553A and a second outer ring member 553B. First outer ring member 553A may be axially adjacent to second outer ring member 553B. As will be described in greater detail below with reference to FIG. 15, first outer ring member 553A and second outer ring member 553B may each define a separate row of bearing-element recesses for mounting superhard bearing elements 160. Radial-bearing apparatus 510 may be assembled by positioning inner bearing assembly 520 adjacent one of first outer ring member 553A and second outer ring member 553B; subsequently, the other of first outer ring member 553A and second outer ring member 553B may be positioned adjacent inner bearing assembly 520 such that inner bearing assembly 520 is rotationally disposed between superhard bearing elements 160 mounted to first outer ring member 553A and second outer ring member 553B in a ball-and-socket-type configuration.

Figure 15:
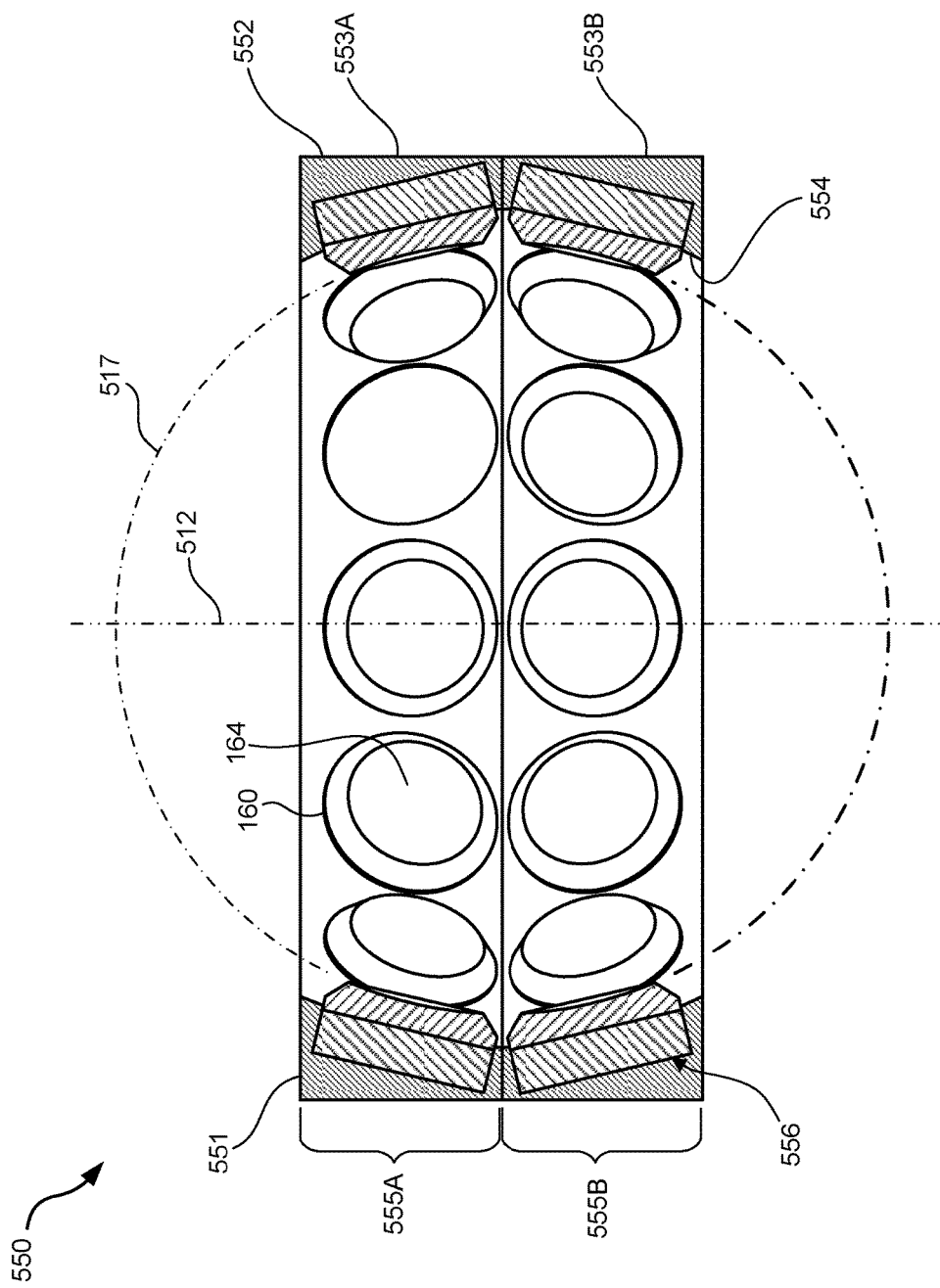
FIG. 15 is a cross-sectional side view of an outer radial-bearing assembly according to at least one embodiment.
Figure 16:
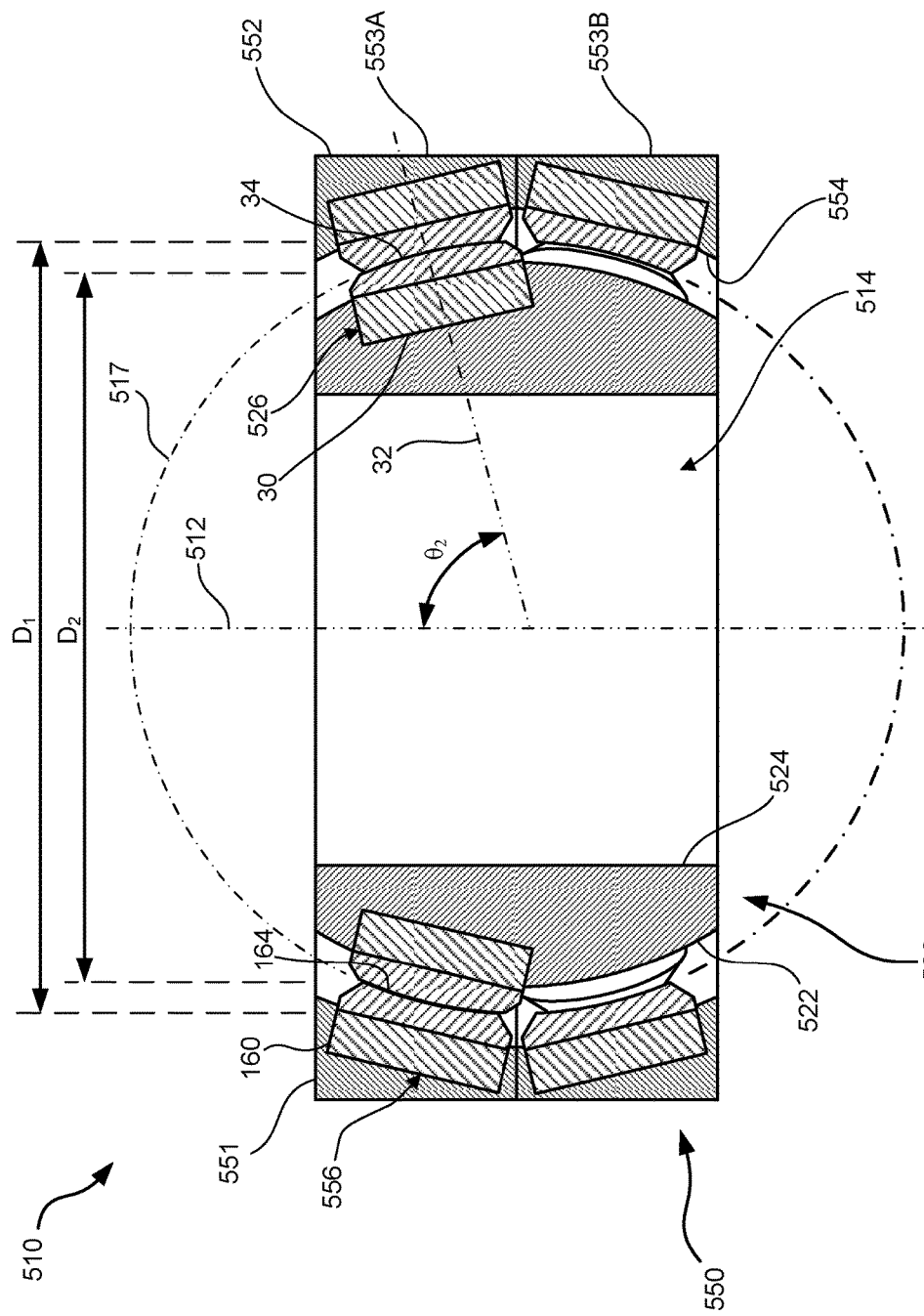
FIG. 16 is a cross-sectional side view of an exemplary radial-bearing apparatus according to at least one embodiment.

Inner support ring 521 may be configured to receive multiple superhard bearing elements 30 (see, e.g., superhard bearing elements 30 illustrated in FIGS. 3A and 3B) that may each be attached within a corresponding bearing-element recess defined in inner support ring 521 (see, e.g., bearing-element recess 526 illustrated in FIG. 16). Additionally, outer support ring 551 may be configured to receive multiple superhard bearing elements 160 (see, e.g., superhard bearing elements 160 illustrated in FIGS. 5A and 5B) that may each be attached within a corresponding bearing-element recess defined in outer support ring 551 (See, e.g., bearing-element recess 556 illustrated in FIG. 15). Each superhard bearing element 30 may extend beyond outer surface 522 of inner support ring 521 by a selected distance. Additionally, each superhard bearing element 160 may extend beyond inner surface 554 of outer support ring 551 by a selected distance. Each of superhard bearing elements 30 and superhard bearing elements 160 may be fixedly secured within a corresponding bearing-element recess 526 or 556, respectively, through brazing, press-fitting, threaded attachment, pin attachment, bonding, frictional engagement, and/or by any other suitable attachment technique, without limitation.

Any suitable number of superhard bearing elements 30 and superhard bearing elements 60 may be secured, respectively, to inner support ring 521 and outer support ring 551. For example, each superhard bearing element 30 may be secured within a corresponding bearing element recess 526 defined in inner support ring 521. Additionally, each superhard bearing element 160 may be secured within a corresponding bearing element recess 556 defined in outer support ring 551. Inner bearing assembly 520 may comprise the same number or a different number of superhard bearing elements 30 in comparison with the number of superhard bearing elements 160 included in outer bearing assembly 550. Additionally, superhard bearing elements 30 may have the substantially the same diameters as superhard bearing elements 160 or different diameters than superhard bearing elements 160.

Inner support ring 521 and outer support ring 551 may each be made from a variety of different materials. For example, inner support ring 521 and/or outer support ring 551 may comprise a metallic material (e.g., carbon steel, steel alloys, tungsten or tungsten alloys, aluminum or aluminum alloys, or stainless steel, etc.), a carbide material (e.g., tungsten carbide, silicon carbide, etc.), or any other suitable material. In some embodiments, inner support ring 521 and/or outer support ring 551 may be made of a material with relatively high thermal conductivity (e.g., tungsten carbide or cobalt-cemented tungsten carbide). Superhard bearing elements 30 may each abut or contact inner support ring 521 over a substantial surface area of the superhard bearing element 30 in order to promote heat transfer from the superhard bearing element 30 to inner support ring 521. Additionally, superhard bearing elements 160 may each abut or contact outer support ring 551 over a substantial surface area of the superhard bearing element 160 in order to promote heat transfer from the superhard bearing element 160 to outer support ring 551.

In some embodiments, inner support ring 521 and/or outer support ring 551 may include an erosion-resistant and/or abrasion-resistant coating applied thereto. For example, an erosion-resistant and abrasion resistant coating may include a coating including, for example, a urethane rubber or other suitable coating, without limitation. In other embodiments, a hardfacing coating (e.g., tungsten carbide hardfacing) may be applied to inner support ring 521 and/or outer support ring 551 by any suitable method, including, without limitation, flame spraying, welding HVOF (high velocity oxy-fuel coating spraying), and/or laser cladding.

According to at least one embodiment, superhard bearing elements 30 may be positioned and oriented on inner support ring 521 and superhard bearing elements 160 may be positioned and oriented on outer support ring 551 such that superhard bearing surfaces 34 of superhard bearing elements 30 contact corresponding superhard bearing surfaces 164 of superhard bearing elements 160. Accordingly, when inner bearing assembly 520 and outer bearing assembly 550 are assembled together, superhard bearing surfaces 34 of superhard bearing elements 30 and the opposing superhard bearing surfaces 164 of superhard bearing elements 160 may bear against each other and move relative to each other as inner bearing assembly 520 rotates relative to outer bearing assembly 550. Superhard bearing elements 30 and superhard bearing elements 160 may comprise various surface shapes and configurations for achieving desired contact and freedom of movement between opposing superhard bearing surfaces.

Figure 13B:
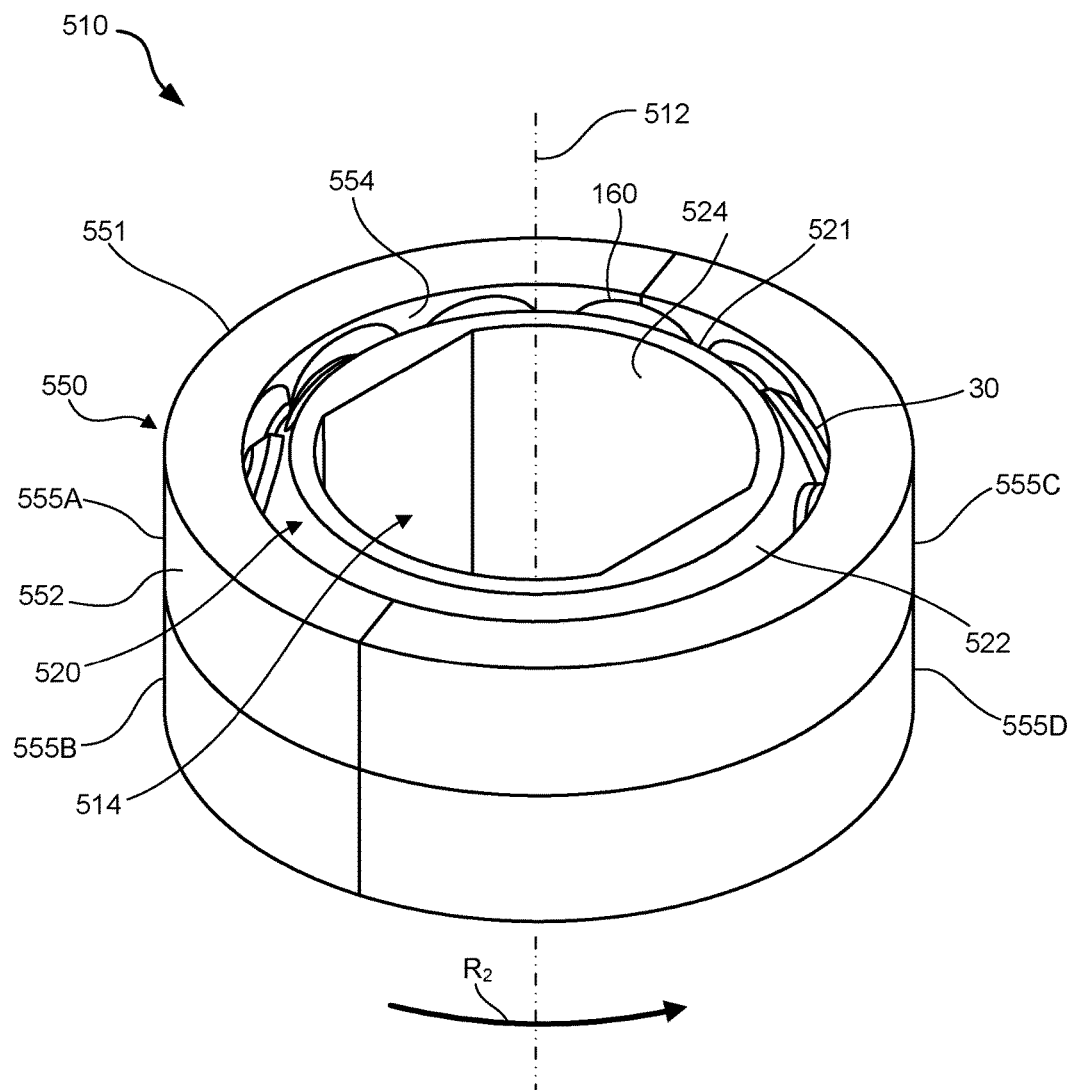
FIG. 13B is a perspective view of a radial-bearing apparatus according to at least one embodiment.

FIG. 13B shows an exemplary radial-bearing apparatus 510, or spherical-bearing apparatus, according to additional embodiments. Radial-bearing apparatus 510 may comprise an inner bearing assembly 520 and an outer bearing assembly 550. As illustrated in FIG. 13B, outer support ring 551 of outer bearing assembly 550 may comprise a first outer ring member 555A, a second outer ring member 555B, a third outer ring member 555C, and a fourth outer ring member 555D. First outer ring member 555A may be axially adjacent to second outer ring member 555B and third outer ring member 555C may be axially adjacent to fourth outer ring member 555D. Additionally, first outer ring member 555A may be circumferentially adjacent to third outer ring member 555C and second outer ring member 555B may be axially adjacent to fourth outer ring member 555D. According to some embodiments, first outer ring member 555A and third outer ring member 555C may together define a row of bearing-element recesses for mounting superhard bearing elements 160. Additionally, second outer ring member 555B and fourth outer ring member 555D may together define another row of bearing-element recesses for mounting superhard bearing elements 160. Outer support ring 551 may also comprise any other suitable number of ring members in any suitable configuration, without limitation.

Figure 14A:
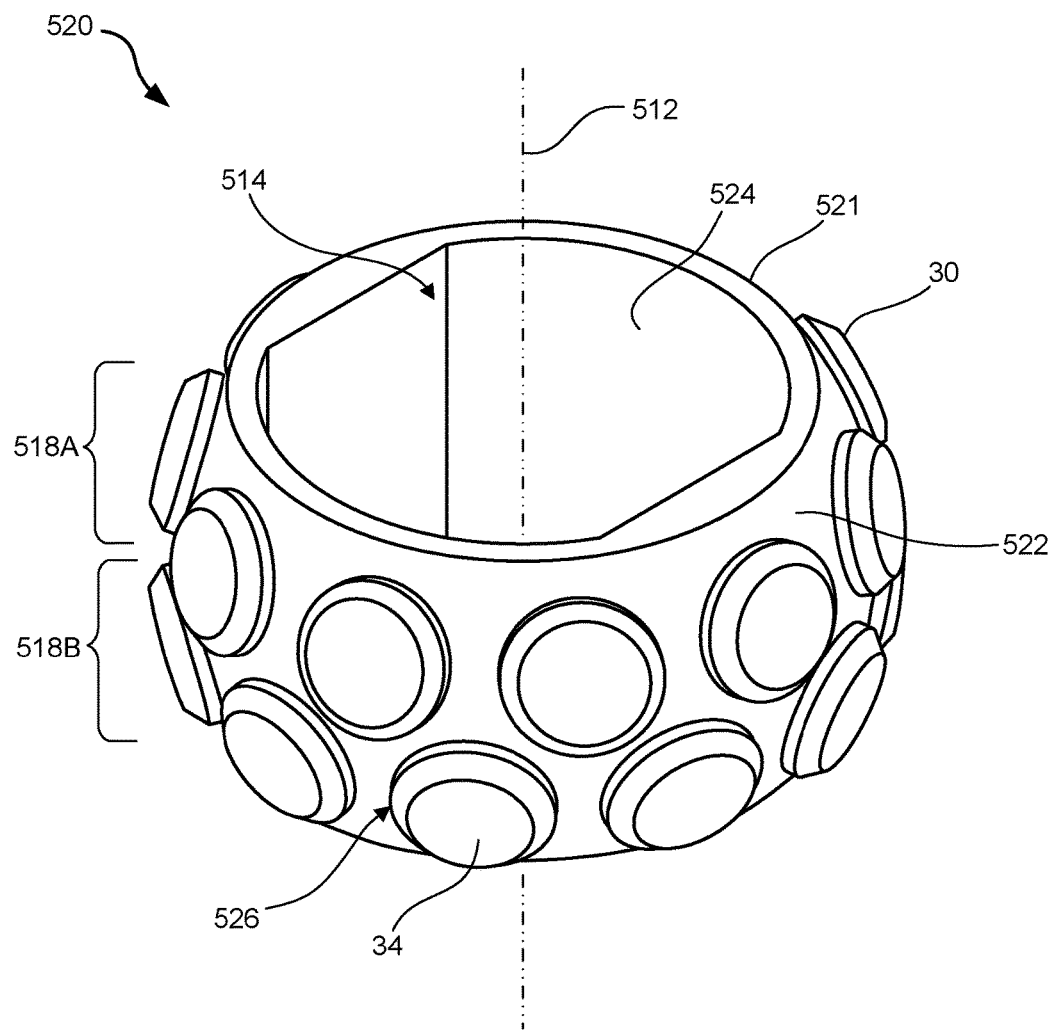
FIG. 14A is a perspective view of an inner radial-bearing assembly according to at least one embodiment.

FIG. 14A is a perspective view of inner radial-bearing assembly 520 of the exemplary radial-bearing apparatus shown in FIG. 13A or 13B. As illustrated in FIG. 14A, superhard bearing elements 30 may be mounted within bearing element recesses 526 defined in inner support ring 521 of inner radial-bearing assembly 520. Superhard bearing elements 30 may each extend outward from inner support ring 521 such that at least a portion of the superhard bearing element 30 extends past outer surface 522 of inner support ring 521. According to at least one embodiment, a portion of superhard bearing element 30 extending from inner support ring 521 may comprise a superhard bearing surface 34. Superhard bearing surface 34 may comprise any suitable shape, without limitation. For example, superhard bearing surface 34 may comprise a rounded convex surface. In some embodiments, superhard bearing surface 34 may comprise a partial-ellipsoidal surface shape. In additional embodiments, superhard bearing surface 34 may comprise a partial-spherical surface shape.

Inner radial-bearing assembly 520 may comprise a plurality of rows of superhard bearing elements 30 that are each circumferentially centered about central bearing axis 512. For example, as shown in FIG. 14A, inner radial-bearing assembly 520 may comprise a first row 518A and a second row 518B of superhard bearing elements 30. As will be shown in greater detail below with reference to FIGS. 16 and 17, superhard bearing elements 30 may be positioned and oriented on inner bearing assembly 520 such that superhard bearing surfaces 34 substantially conform to a surface of a conceptual sphere. Each of first row 518A and second row 518B of superhard bearing elements 30 of inner radial-bearing assembly 520 may be oriented at different angles relative to central bearing axis 512. Outer surface 522 of inner support ring 521 may comprise any suitable shape configured to fit within a corresponding aperture defined by outer support ring 551, including, for example, a partial-spherical surface shape.

Figure 14B:
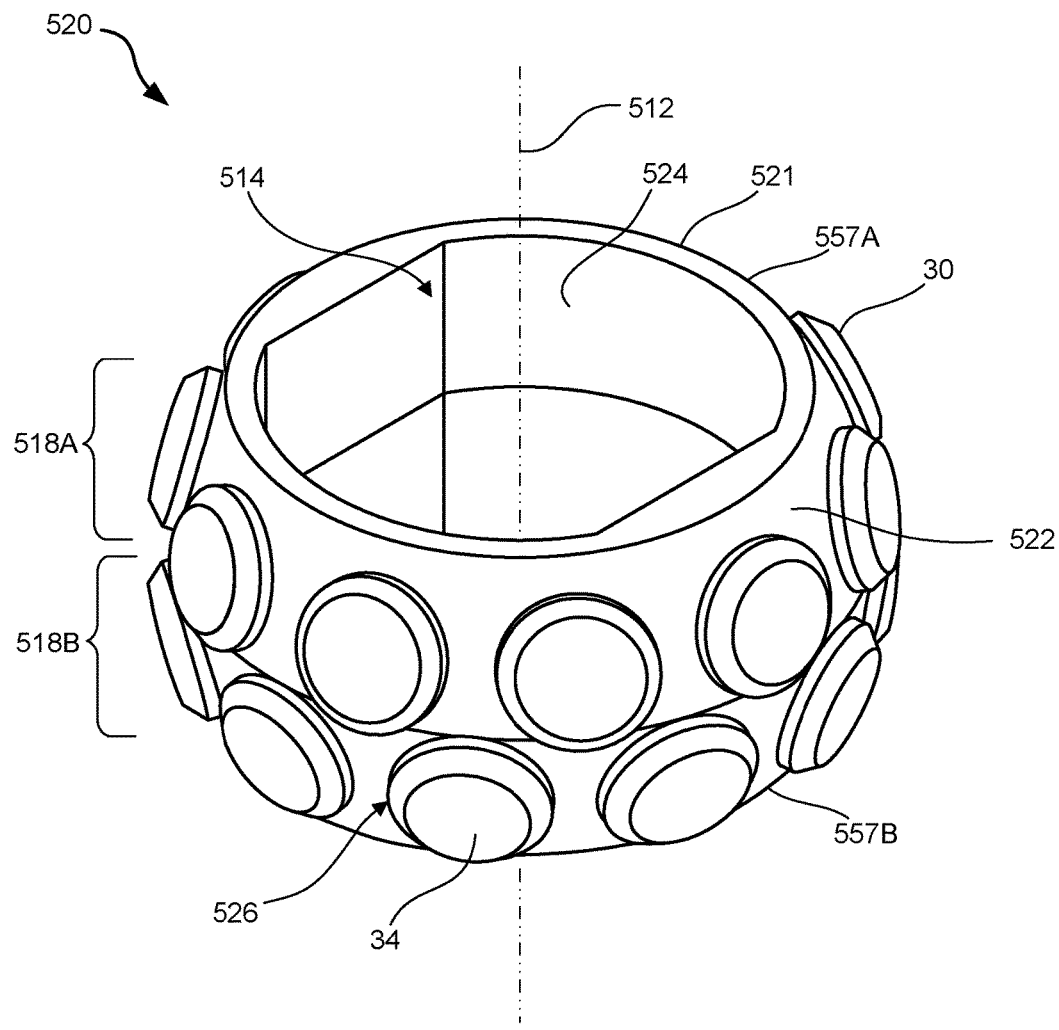
FIG. 14B is a perspective view of an inner radial-bearing assembly according to at least one embodiment.

FIG. 14B shows an exemplary inner radial-bearing assembly 520, or spherical-bearing apparatus, of the exemplary radial-bearing apparatus shown in FIG. 13A or 13B according to additional embodiments. As illustrated in FIG. 14B, inner support ring 521 of inner bearing assembly 520 may comprise a first inner ring member 557A and a second inner ring member 557B. First inner ring member 557A may be axially adjacent to second inner ring member 557B. As shown in FIG. 14B, first inner ring member 557A and second inner ring member 557B may each define a separate row of bearing-element recesses 526 for mounting superhard bearing elements 160. Inner support ring 521 may also comprise any other suitable number of ring members in any suitable configuration, without limitation.

FIG. 15 is a cross-sectional side view of outer radial-bearing assembly 550 of the exemplary radial-bearing apparatus 510 illustrated in FIG. 13A or 13B. As illustrated in FIG. 15, superhard bearing elements 160 may be mounted within bearing element recesses 556 defined in outer support ring 551. Superhard bearing elements 160 may each extend inward from outer support ring 551 such that at least a portion of the superhard bearing element 160 extends past inner surface 554 of outer support ring 551. According to at least one embodiment, a portion of superhard bearing element 160 extending from outer support ring 551 may comprise a superhard bearing surface 164.

Superhard bearing surfaces 164 may each comprise any suitable shape, without limitation. For example, superhard bearing surface 164 may comprise a rounded concave surface. In some embodiments, superhard bearing surface 164 may comprise a partial-ellipsoidal surface shape having a radius of curvature conforming to a partial-ellipsoidal surface shape of a superhard bearing surface 34 on inner bearing assembly 520. In additional embodiments, superhard bearing surface 164 may alternatively comprise a partial-cylindrical shape or partial-spherical shape, conforming to a portion of a partial-ellipsoidal or partial-spherical surface shape of a superhard bearing surface 34 on inner bearing assembly 520 (see, e.g., superhard bearing element 60 illustrated in FIGS. 4A-4C). In at least one embodiment, one or more superhard bearing surfaces 164 may each comprise a generally planar surface having a region that is configured to contact superhard bearing surfaces 34 on inner bearing assembly 520 (see, e.g., superhard bearing element 260 illustrated in FIGS. 6A and 6B).

Outer radial-bearing assembly 550 may comprise a plurality of rows of superhard bearing elements 160 that are each circumferentially centered about central bearing axis 512. For example, as shown in FIG. 14, outer radial-bearing assembly 550 may comprise a first row 555A of superhard bearing elements 160 mounted to first outer ring member 553A. Additionally, outer radial-bearing assembly 550 may comprise a second row 555B of superhard bearing elements 160 mounted to second outer ring member 553B.

As illustrated in FIG. 15, superhard bearing elements 160 may be positioned and oriented on outer bearing assembly 550 such that superhard bearing surfaces 164 substantially coincide with a surface of a spherical outline 517. Spherical outline 517 represents an outline of a conceptual sphere having a surface that passes over and/or substantially conforms to a sphere with a selected radius. As shown in FIG. 15, superhard bearing elements 160 may be positioned and oriented on outer bearing assembly 550 such that superhard bearing surfaces 164 substantially coincide with spherical outline 517. As such, superhard bearing surfaces 164 may comprise partial-spherical surfaces that are congruent with or coincide with adjacent portions of spherical outline 517. Accordingly, each of first row 555A and second row 555B of superhard bearing elements 160 of outer radial-bearing assembly 550 may be oriented at different angles relative to central bearing axis 512. Inner surface 554 of outer support ring 551 may comprise any suitable shape defining aperture 514 configured to surround inner support ring 521, including, for example, a partial-spherical surface shape.

FIG. 16 is a cut-away cross-sectional side view of the radial-bearing apparatus 510 illustrated in FIG. 13A or 13B according to various embodiments. According to at least one embodiment, radial-bearing apparatus 510 may include a rotor or inner bearing assembly 520 and a stator or outer bearing assembly 550.

In some embodiments, inner bearing assembly 520 and outer bearing assembly 550 may both be aligned with each other and/or may be circumferentially centered about central bearing axis 512. As shown in FIG. 16, superhard bearing surfaces 34 of superhard bearing elements 30 may each comprise a convex surface that opposes and bears against a superhard bearing surface 164 of a superhard bearing element 160 comprising a concave surface (e.g., partial-ellipsoidal) with a radius of curvature conforming to the surface shape (e.g. partial-ellipsoidal) of superhard bearing surface 34.

As shown in FIG. 16, superhard bearing elements 30 and/or superhard bearing elements 160 may be oriented at an oblique angle from the central bearing axis. For example, a central element axis 32, about which a superhard bearing element 30 and a superhard bearing element 160 are centered, may be disposed at an angle $\theta_2$ from central bearing axis 512. According to some embodiments, inner bearing assembly 520 may be secured within outer bearing assembly 550. As such, inner bearing assembly 520 may be prevented from being dislodged from outer bearing assembly 550 during drilling. As shown, for example, in FIG. 16, inner bearing assembly 520 may have an outer diameter $D_1$ that is greater than an inner diameter $D_2$ of outer bearing assembly 550 surrounding inner bearing assembly 520.

As further shown in FIG. 16, superhard bearing surfaces 34 of superhard bearing elements 30 may each comprise a convex surface shape (e.g., a partial-spherical or partial-ellipsoidal shape) having substantially the same radius of curvature as spherical outline 517. Spherical outline 517 represents an outline of a conceptual sphere having a surface that substantially conforms to bearing surfaces 34 of each of bearing elements 30. As shown in FIG. 16, superhard bearing elements 30 may be positioned and oriented on inner bearing assembly 520 such that superhard bearing surfaces 34 substantially conform to or lie upon spherical outline 517. As such, each of superhard bearing surfaces 34 may comprise a partial-spherical surface that substantially coincides with a respective portion of spherical outline 517. Additionally, at least a portion of each of bearing surfaces 164 of superhard bearing elements 160 may substantially coincide with a respective portion of spherical outline 517.

As inner bearing assembly 520 rotates with respect to outer bearing assembly 550, superhard bearing surfaces 34 of superhard bearing elements 30 may remain substantially coincident or congruent with respective portions of spherical outline 517. Additionally, as will be discussed in greater detail below with respect to FIG. 17, superhard bearing surfaces 34 of superhard bearing elements 30 may also be generally or substantially aligned or congruent with portions of spherical outline 517 when inner bearing assembly 520 tilts with respect to outer bearing assembly 550.

Figure 17:
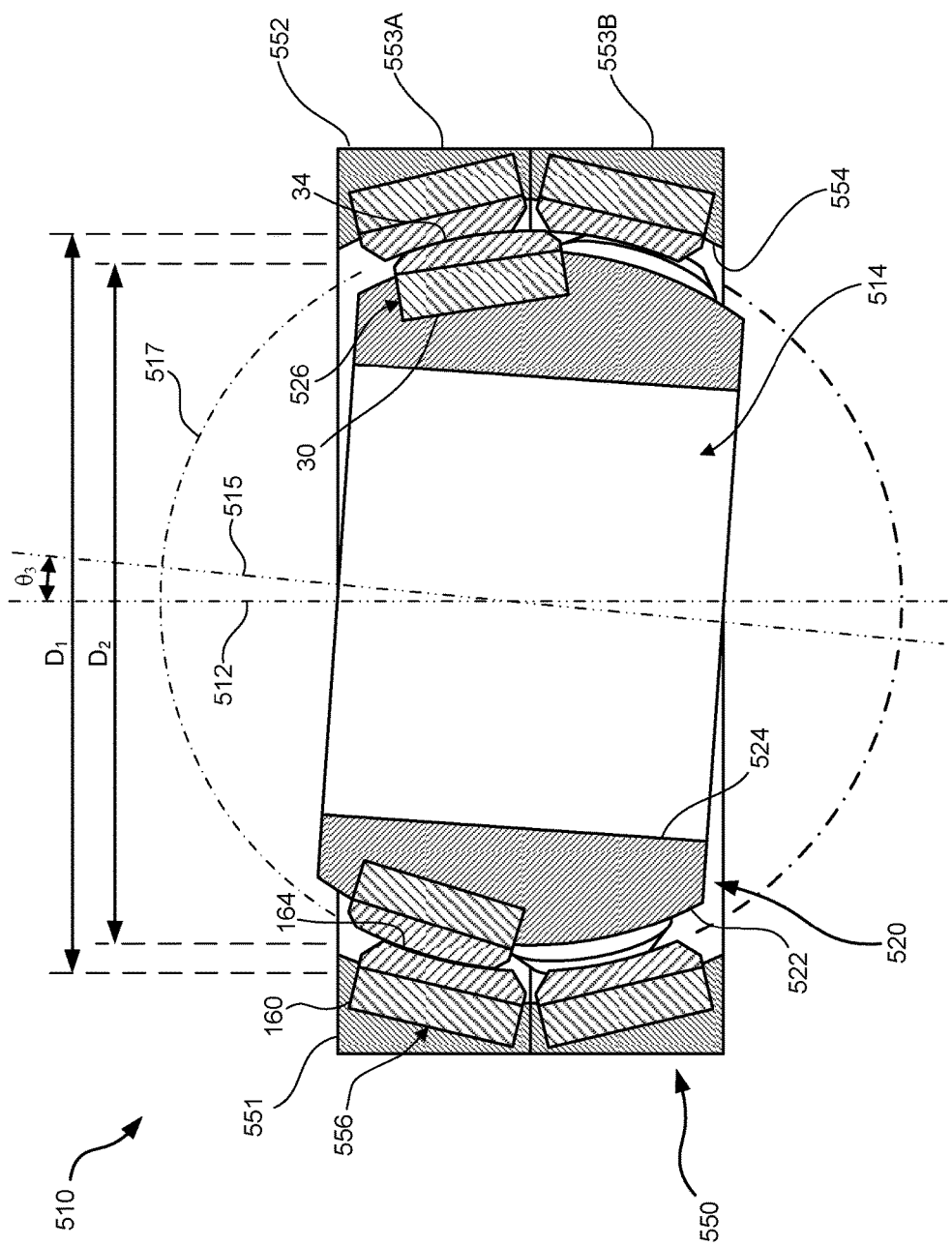
FIG. 17 is a cross-sectional side view of an exemplary radial-bearing apparatus according to at least one embodiment.

FIG. 17 illustrates the exemplary radial-bearing apparatus 510 illustrated in FIG. 16, but wherein inner bearing assembly 520 is tilted at an angle with respect to outer bearing assembly 550. As shown in FIG. 17, inner bearing assembly 520 is tilted at an angle with respect to outer bearing assembly 550 such that inner bearing assembly 520 is circumferentially centered about a different axis than outer bearing assembly 550. For example inner bearing assembly 520 may be circumferentially centered about central bearing axis 515, which is tilted at an angle $\theta_3$ with respect to central bearing axis 512 about which outer bearing assembly 550 is circumferentially centered (angle $\theta_3$ may also correspond to the angle at which a surface of inner bearing assembly 520 is oriented with respect to a corresponding surface of outer bearing assembly 550).

While inner bearing assembly 520 is tilted with respect to outer bearing assembly 550, superhard bearing surfaces 34 of superhard bearing elements 30 may continue to bear against superhard bearing surfaces 164 of superhard bearing elements 160. For example, as shown in FIG. 17, a more peripheral portion of a superhard bearing surface 34 than that shown in FIG. 16 may bear against the opposing superhard bearing surface 164. Because superhard bearing surfaces 34 of inner bearing assembly 520 may be substantially coincident with spherical outline 517, superhard bearing surfaces 34 may continue to move freely with respect to superhard bearing surfaces 164 of outer bearing assembly 550, allowing for rotation of inner bearing assembly 520 with respect to outer bearing assembly 550. For example, while inner bearing assembly 520 is tilted with respect to outer bearing assembly 550, inner bearing assembly 520 may rotate with respect to outer bearing assembly 550 about central bearing axis 515 while maintaining bearing surface contact with outer bearing assembly 550. In some embodiments, while inner bearing assembly 520 is tilted with respect to outer bearing assembly 550, outer bearing assembly 550 may rotate with respect to inner bearing assembly 520 about central bearing axis 512 while maintaining bearing surface contact with inner bearing assembly 520.

Inner bearing assembly 520 as a whole may be prevented from being axially displaced from outer bearing assembly 550 during drilling. While a portion of inner bearing assembly 520 may be tilted and thus displaced from outer bearing assembly 550 during drilling, inner bearing assembly 520 may not be axially displaced from outer bearing assembly 550 due to the shape and configuration of outer bearing assembly 550. For example, as discussed above in relation to FIG. 16, inner bearing assembly 520 may have an outer diameter $D_1$ that is greater than an inner diameter $D_2$ of outer bearing assembly 550 surrounding inner bearing assembly 520. Even in the tilted state illustrated in FIG. 17, inner bearing assembly 520 may have an outer diameter $D_1$ that is greater than inner diameter $D_2$ of outer bearing assembly 550.

Moreover, as shown in FIG. 17, while a portion of inner bearing assembly 520 may be tilted and thus displaced from outer bearing assembly 550 during drilling or other application/operation, a circumferentially opposite portion of inner bearing assembly 520 may be tilted and displaced from outer bearing assembly 550 in an opposite direction such that inner bearing assembly 520 experiences little to no axial displacement (i.e., along central bearing axis 512) as a whole with respect to outer bearing assembly 550. Accordingly, a drilling shaft coupled to inner bearing assembly 520, or in some embodiments to outer bearing assembly 550, may be deflected during drilling without impacting the axial alignment of inner bearing assembly 520 with respect to outer bearing assembly 550.

Figure 18:
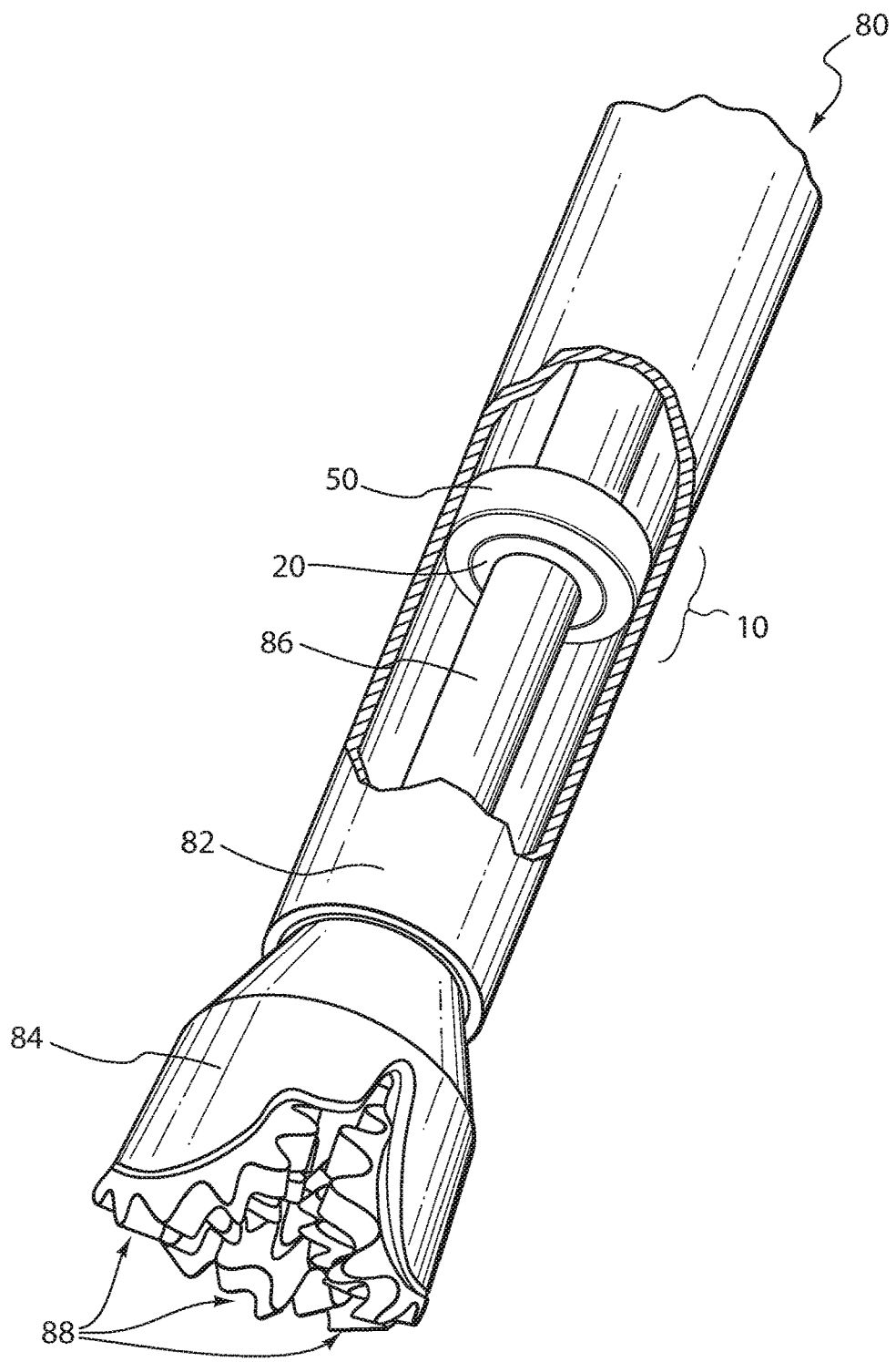
FIG. 18 is a partial cut-away perspective view of an exemplary subterranean drilling system according to at least one embodiment.

FIG. 18 is a partial cross-sectional perspective view of an exemplary subterranean drilling system 80 that includes a radial-bearing apparatus 10, as shown in FIGS. 1 and 2, according to at least one embodiment. Alternatively, any other bearing apparatus as disclosed herein may be used in place of radial-bearing apparatus 10 of subterranean drilling system 80 illustrated in FIG. 18. Subterranean drilling system 80 may include a housing 82 enclosing a downhole drilling motor (i.e., a motor, turbine, or any other suitable device capable of rotating an output shaft, without limitation) that is operably connected to an output shaft 86.

Radial-bearing apparatus 10 may be operably coupled to downhole output shaft 86 such that the rotor or inner bearing assembly 20 rotates in conjunction with output shaft 86, while the stator or outer bearing assembly 50 remains stationary with respect to output shaft 86. A rotary drill bit 84, such as a rotary drill bit configured to engage a subterranean formation and drill a borehole, may be connected to output shaft 86. As illustrated in FIG. 18, rotary drill bit 84 may be a roller cone bit comprising a plurality of roller cones 88. According to additional embodiments, rotary drill bit 84 may comprise any suitable type of rotary drill bit, such as, for example, a so-called fixed-cutter drill bit. As a borehole is drilled using rotary drill bit 84, pipe sections may be connected to subterranean drilling system 80 to form a drill string capable of progressively drilling the borehole to a greater depth within a subterranean formation. Any of the bearing assemblies disclosed herein may be used in subterranean drilling system 80, without limitation.

According to various embodiments, drilling fluid may be circulated through the downhole drilling motor to generate torque and effect rotation of output shaft 86 and rotary drill bit 84 attached thereto so that a borehole may be drilled. A portion of the drilling fluid may also be used to lubricate opposing bearing surfaces of superabrasive elements on inner bearing assembly 20 and outer bearing assembly 50.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A radial bearing assembly, comprising:
   an inner support ring circumferentially surrounding a central bearing axis;
   a plurality of superhard bearing elements coupled to the inner support ring, each of the plurality of superhard bearing elements comprising:
      a base;
      a superhard bearing surface comprising a partial-spherical surface shape oriented outwardly from the central bearing axis;
      a side surface centered about a central element axis, the side surface and the central element axis extending between the base and the superhard bearing surface;
   wherein:
      the superhard bearing surfaces of the plurality of superhard bearing elements collectively substantially conform to a common spherical reference surface;
      the central element axes of the plurality of superhard bearing elements are oriented substantially perpendicular to the central bearing axis.

2. The bearing assembly of claim 1, wherein the superhard bearing surface has a radius of curvature that is substantially centered about the central bearing axis.

3. The bearing assembly of claim 1, wherein the superhard bearing surface comprises a convex surface oriented outwardly from the central bearing axis.

4. The bearing assembly of claim 1, wherein each of the plurality of superhard bearing elements is fixed within a respective bearing-element recess defined within the inner support ring.

5. The bearing assembly of claim 1, wherein each of the plurality of superhard bearing elements comprises a polycrystalline diamond table bonded to a substrate, the polycrystalline diamond table comprising the superhard bearing surface.

6. A bearing apparatus, comprising:
an inner bearing assembly comprising:
an inner support ring circumferentially surrounding an inner ring axis;
a first plurality of superhard bearing elements coupled to the inner support ring, each of the first plurality of superhard bearing elements having a side surface centered about a central element axis, the side surface and the central element axis extending between a base and a superhard bearing surface, the superhard bearing surface comprising a partial-spherical surface shape oriented outwardly from the inner ring axis, wherein:
the superhard bearing surfaces of the first plurality of superhard bearing elements collectively substantially conform to a common spherical reference surface;
the central element axes of the first plurality of superhard bearing elements are oriented substantially perpendicular to the inner ring axis;
an outer bearing assembly comprising
an outer support ring circumferentially surrounding an outer ring axis;
a second plurality of superhard bearing elements coupled to the outer support ring, each of the second plurality of superhard bearing elements having a side surface extending between a base and a superhard bearing surface, the superhard bearing surface of each of the second plurality of superhard bearing elements contacting a superhard bearing surface of at least an opposing one of the first plurality of superhard bearing elements.

7. The bearing apparatus of claim 6, wherein the superhard bearing surface of each of the second plurality of superhard bearing elements comprises an arcuate surface.

8. The bearing apparatus of claim 6, wherein:
the superhard bearing surface of each of the first plurality of superhard bearing elements comprises a convex surface;
the superhard bearing surface of each of the second plurality of superhard bearing elements comprises a concave surface.

9. The bearing apparatus of claim 6, wherein the superhard bearing surface of each of the second plurality of superhard bearing elements comprises a flat surface.

10. The bearing apparatus of claim 6, wherein the inner bearing assembly is rotatable relative to the outer bearing assembly when the inner ring axis is oriented at an angle from the outer ring axis.

11. The bearing assembly of claim 6, wherein each of the first plurality of superhard bearing elements and each of the second plurality of superhard bearing elements comprises a polycrystalline diamond table bonded to a substrate, the polycrystalline diamond table comprising the superhard bearing surface.

12. The bearing apparatus of claim 6, wherein:
the inner bearing assembly is configured as one of a rotor and a stator;
the outer bearing assembly is configured as the other of the rotor and the stator.

13. A subterranean drilling system, comprising:
an output shaft operable to apply torque to a rotary drill tool, the output shaft operably coupled to a bearing apparatus, the bearing apparatus comprising:
an inner bearing assembly comprising:
an inner support ring circumferentially surrounding an inner ring axis;
a first plurality of superhard bearing elements coupled to the inner support ring, each of the first plurality of superhard bearing elements having a side surface centered about a central element axis, the side surface and the central element axis extending between a base and a superhard bearing surface, the superhard bearing surface comprising a partial-spherical surface shape oriented outwardly from the inner ring axis, wherein:
the superhard bearing surfaces of the first plurality of superhard bearing elements collectively substantially conform to a common spherical reference surface;
the central element axes of the first plurality of superhard bearing elements are oriented substantially perpendicular to the inner ring axis;
an outer bearing assembly comprising
an outer support ring;
a second plurality of superhard bearing elements coupled to the outer support ring, each of the second plurality of superhard bearing elements having a side surface extending between a base and a superhard bearing surface, the superhard bearing surface of each of the second plurality of superhard bearing elements contacting a superhard bearing surface of at least an adjacent one of the first plurality of superhard bearing element.

* * * * *